(12) United States Patent
Petersen et al.

(10) Patent No.: US 10,660,039 B1
(45) Date of Patent: May 19, 2020

(54) ADAPTIVE OUTPUT OF INDICATIONS OF NOTIFICATION DATA

(71) Applicant: Google Inc., Mountain View, CA (US)

(72) Inventors: Morten Just Petersen, San Francisco, CA (US); Joshua Robin Kaplan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 659 days.

(21) Appl. No.: 14/736,667

(22) Filed: Jun. 11, 2015

Related U.S. Application Data

(60) Provisional application No. 62/044,668, filed on Sep. 2, 2014.

(51) Int. Cl.
| | | |
|---|---|---|
| *H04M 1/725* | (2006.01) | |
| *H04W 52/02* | (2009.01) | |
| *H04W 4/12* | (2009.01) | |
| *H04W 4/02* | (2018.01) | |
| *H04W 68/02* | (2009.01) | |

(52) U.S. Cl.
CPC ....... *H04W 52/0254* (2013.01); *H04W 4/027* (2013.01); *H04W 4/12* (2013.01); *H04W 68/02* (2013.01)

(58) Field of Classification Search
CPC . H04W 52/0254; H04W 4/027; H04W 4/028; H04W 4/12; H04W 68/02
USPC .......................................... 455/412.2, 12.24
See application file for complete search history.

(56) References Cited

U.S. PATENT DOCUMENTS

| | | | |
|---|---|---|---|
| 6,151,208 A | | 11/2000 | Bartlett |
| 6,874,127 B2 | | 3/2005 | Newell et al. |
| 7,180,502 B2 | | 2/2007 | Marvit et al. |
| 7,184,025 B2 | | 2/2007 | Williams et al. |
| 7,498,951 B2 | | 3/2009 | Wardimon |
| 8,014,733 B1 | * | 9/2011 | Gailloux ................ H04B 1/385 455/90.3 |

(Continued)

FOREIGN PATENT DOCUMENTS

| | | |
|---|---|---|
| EP | 2079004 A1 | 7/2009 |
| EP | 2499552 A1 | 9/2012 |

(Continued)

OTHER PUBLICATIONS

Chavez, "Get iOS-style lockscreen notifications on Android with SlideLock," Phandroid, Mar. 8, 2014, Retrieved from <http://phandroid.com/2014/03/08/how-to-get-ios-lock-screen-on-android/> 6 pgs.

(Continued)

*Primary Examiner* — Khoi H Tran
*Assistant Examiner* — B M M Hannan
(74) *Attorney, Agent, or Firm* — Shumaker & Sieffert, P.A.

(57) ABSTRACT

A computing device may receive an indication of a detected movement of the computing device. Responsive to a determination to output an indication of notification data, the computing device may output, for presentation to a user of the computing device by an output device, the indication of the notification data. The determination to output the indication of the notification data may be based on a degree of correspondence between the detected movement of the computing device and a predefined movement of the computing device and may also be based on one or more characteristics of the notification data.

14 Claims, 8 Drawing Sheets

(56) References Cited

U.S. PATENT DOCUMENTS

| | | | |
|---|---|---|---|
| 8,280,732 B2 | 10/2012 | Richter et al. | |
| 8,344,998 B2 | 1/2013 | Fitzgerald et al. | |
| 8,392,007 B1* | 3/2013 | Izo | G06F 3/165 |
| | | | 455/3.06 |
| 8,515,505 B1 | 8/2013 | Pattikonda | |
| 8,560,004 B1 | 10/2013 | Tsvetkov et al. | |
| 8,701,032 B1 | 4/2014 | Zhai et al. | |
| 8,784,271 B2 | 7/2014 | Brumback et al. | |
| 8,819,569 B2 | 8/2014 | SanGiovanni et al. | |
| 9,008,629 B1* | 4/2015 | Masterman | H04W 52/0251 |
| | | | 379/207.03 |
| 9,009,516 B1 | 4/2015 | Gabayan et al. | |
| 2006/0221881 A1* | 10/2006 | Morisawa | H04W 52/0245 |
| | | | 370/311 |
| 2007/0288157 A1* | 12/2007 | Peterman | G01C 21/30 |
| | | | 455/404.1 |
| 2008/0139331 A1* | 6/2008 | Jang | A63B 69/3608 |
| | | | 473/215 |
| 2008/0174547 A1 | 7/2008 | Kanevsky et al. | |
| 2008/0192005 A1 | 8/2008 | Elgoyhen et al. | |
| 2008/0255795 A1 | 10/2008 | Shkolnikov | |
| 2008/0291160 A1 | 11/2008 | Rabin | |
| 2009/0195497 A1 | 8/2009 | Fitzgerald et al. | |
| 2009/0265671 A1 | 10/2009 | Sachs et al. | |
| 2010/0138785 A1 | 6/2010 | Uoi et al. | |
| 2010/0235667 A1 | 9/2010 | Mucignat et al. | |
| 2011/0018731 A1* | 1/2011 | Linsky | G06F 1/163 |
| | | | 715/863 |
| 2011/0054833 A1 | 3/2011 | Mucignat | |
| 2011/0177802 A1 | 7/2011 | Gupta | |
| 2011/0310005 A1 | 12/2011 | Chen et al. | |
| 2012/0016641 A1 | 1/2012 | Raffa et al. | |
| 2012/0254646 A1 | 10/2012 | Lin | |
| 2012/0272194 A1 | 10/2012 | Yang et al. | |
| 2012/0297226 A1 | 11/2012 | Mucignat et al. | |
| 2013/0189963 A1* | 7/2013 | Epp | H04M 1/64 |
| | | | 455/414.1 |
| 2013/0222270 A1 | 8/2013 | Winkler et al. | |
| 2013/0222271 A1 | 8/2013 | Alberth et al. | |
| 2013/0234924 A1 | 9/2013 | Janefalkar et al. | |
| 2013/0249785 A1 | 9/2013 | Alameh | |
| 2013/0265218 A1 | 10/2013 | Moscarillo | |
| 2013/0300687 A1 | 11/2013 | Park | |
| 2014/0071037 A1 | 3/2014 | Cohen et al. | |
| 2014/0139454 A1 | 5/2014 | Misty et al. | |
| 2014/0191955 A1 | 7/2014 | Raffa et al. | |
| 2014/0253429 A1 | 9/2014 | Dai et al. | |
| 2014/0282270 A1 | 9/2014 | Slonneger | |
| 2015/0004944 A1* | 1/2015 | Steeves | H04W 4/02 |
| | | | 455/412.2 |
| 2015/0186092 A1* | 7/2015 | Francis | G06F 3/1423 |
| | | | 345/520 |
| 2016/0037482 A1* | 2/2016 | Higgins | H04W 68/005 |
| | | | 455/414.1 |

FOREIGN PATENT DOCUMENTS

| | | |
|---|---|---|
| GB | 2419433 A | 4/2006 |
| WO | 2011057287 A1 | 5/2011 |

OTHER PUBLICATIONS

Ritchie, "Lock Screen," iMore, Retrieved from <http://www.imore.com/lock-screen-iphone-ipad> on Jul. 7, 2014, 6 pgs.

Silver Finger Software, "LockerPro Lockscreen Free," Google Play Apps, Jun. 3, 2014, Retrieved from <https://play.google.com/store/apps/details?id=com.productigeeky.lockerprolite> 3 pgs.

Shah, Casio G-Shock with High Brightness LED Automatically Illuminates the Display When the User Tilts the Walch Toward the Eyes to Check the Time—Fareastgizmos, downloaded from fareastgizmos.com on Jan. 7, 2014, 3 pp.

Introducing the Meteor Your Voice and Gesture-Controlled Smartwatch, Two-Way Voice & Gesture Control Communicator, Kreyos—The Meteor smart watch, downloaded from https://kreyos.com/ on Jun. 3, 2014, 8 pages.

Jon Fingas, "Android Wear will reportedly let you navigate with a flick of the wrist," Engadget, Retrieved from http:/www.engadget.com/2015/03/1 0/androidweargestureandwifileak/, Mar. 10, 2015, 19 pp.

Kreyos, "Introducing Meteor, Two-Way Voice & Gesture Control Communicator—Your Phone in Your Pocket," retrieved from www.kreyos.com/?utm_source=indiegogo&utm_medium=web&utm_campaign=igg on Jan. 7, 2014, 8 pp.

Shanklin, "Review: Pebble Smartwatch", retrieved from www.gizmag.com/pebble-watch-review/28990, Sep. 8, 2013, 11 pages, downloaded on Jan. 7, 2014.

Wikipedia, "Correlation and Dependance," http://en.wikipedia.org/wikiCorrelation_and_dependence#Pearson.27s_product-moment_coefficient, accessed Mar. 13, 2013, 8 pp.

Wikipedia, "Covariance," http://en.wikipedia.org/wiki/Covariance, accessed Mar. 13, 2013, 6 pp.

Wikipedia, "Pearson Product-Moment Correlation Coefficient," http://en.wikipedia.org/wiki/Pearson_product-moment_correlation_coefficient, accessed Mar. 13, 2013, 13 pp.

\* cited by examiner

ADAPTIVE OUTPUT OF INDICATIONS OF
NOTIFICATION DATA

This application claims the benefit of U.S. Provisional Application No. 62/044,668, filed Sep. 2, 2014, the entire content of which is hereby incorporated by reference.

BACKGROUND

Some wearable computing devices (e.g., smart watches, activity trackers, heads-up display components) may output ambient screen content (i.e., user interface) for display. The ambient screen content may contain basic information, such as the current time and date. In general, when the display component of the wearable computing device displays the ambient screen content, most pixels of the display component are not illuminated. However, when a wearable computing device receives notification data, the wearable computing device may output interactive screen content for display. The interactive screen content may include an indication of the notification data. For instance, the interactive screen content may include an indication of an incoming voice call, an indication of a text/instant message, an indication of a news alert, or an indication of another event. When the display component displays the interactive screen content, many or all of the pixels of the display component are illuminated. Thus, the interactive screen content may be associated with higher consumption of electrical energy than the ambient screen content. Furthermore, because many or all of the pixels of the display component are illuminated, the user's attention may be drawn to the interactive screen content. When the wearable computing device outputs the interactive screen content for display, the user can view and respond to indications of notification data, issue voice commands to the wearable computing device, and so on.

In addition to generating the interactive screen content for display in response to receiving notification data, the wearable computing device may output the interactive screen content for display in response to receiving an indication that the wearable computing device has moved in a particular way. For instance, the wearable computing device may provide the interactive screen content for display in place of the ambient screen content in response to determining that the wearable computing device has moved in a manner consistent with a movement of the user to align a display component of the wearable computing device with the user's field of view in order to interact with the wearable computing device.

There may be instances where the wearable computing device moves in a particular way, but the user does not intend to interact with the wearable computing device. As a result, the wearable computing device may present the interactive screen content for display without the user of the wearable computing device actually intending to interact with the wearable computing device. Because the interactive screen content is associated with increased consumption of electrical energy, displaying the interactive screen content in instances where the user does not intend to interact with the wearable computing device may result in diminished battery life and increased user distraction.

BRIEF DESCRIPTION OF DRAWINGS

The details of one or more examples are set forth in the accompanying drawings and the description below. Other features, objects, and advantages of the disclosure will be apparent from the description, drawings, and claims.

DETAILED DESCRIPTION

In general, techniques of this disclosure may enable a computing device (e.g., a smartwatch, activity tracker, heads-up display device) to intelligently adjust how and/or whether the computing device annunciates, or otherwise outputs, indications of notification data. As described in this disclosure, the computing device (or a companion computing device) may determine whether the computing device is to output an indication of notification data. The computing device (or the companion computing device) may make this determination based on a degree of correspondence between a detected movement of the computing device and a pre-defined "wake-up" movement of the computing device. The computing device (or companion computing device) may also make this determination based on one or more characteristics of the notification data. Making this determination based on the degree of correspondence as well as the one or more characteristics of the notification data may reduce the frequency with which the computing device outputs indications of notification data when the user of the computing device is not interested in viewing the indications of notification data. Thus, the techniques of this disclosure may conserve the battery power of the computing device as well as reduce user distraction.

In this way, the computing device (or a processor thereof) may receive an indication of a detected movement of the computing device as detected by a motion sensor operatively coupled to the computing device. Responsive to a determination to output an indication of notification data, the computing device may annunciate or otherwise provide, for presentation at an output component operatively coupled to the computing device, the indication of the notification data. The determination to output the indication of the notification data may be based on a degree of correspondence between the indication of the detected movement of the computing device and a predefined movement of the computing device and is further based on one or more characteristics of the notification data.

Figure 1:
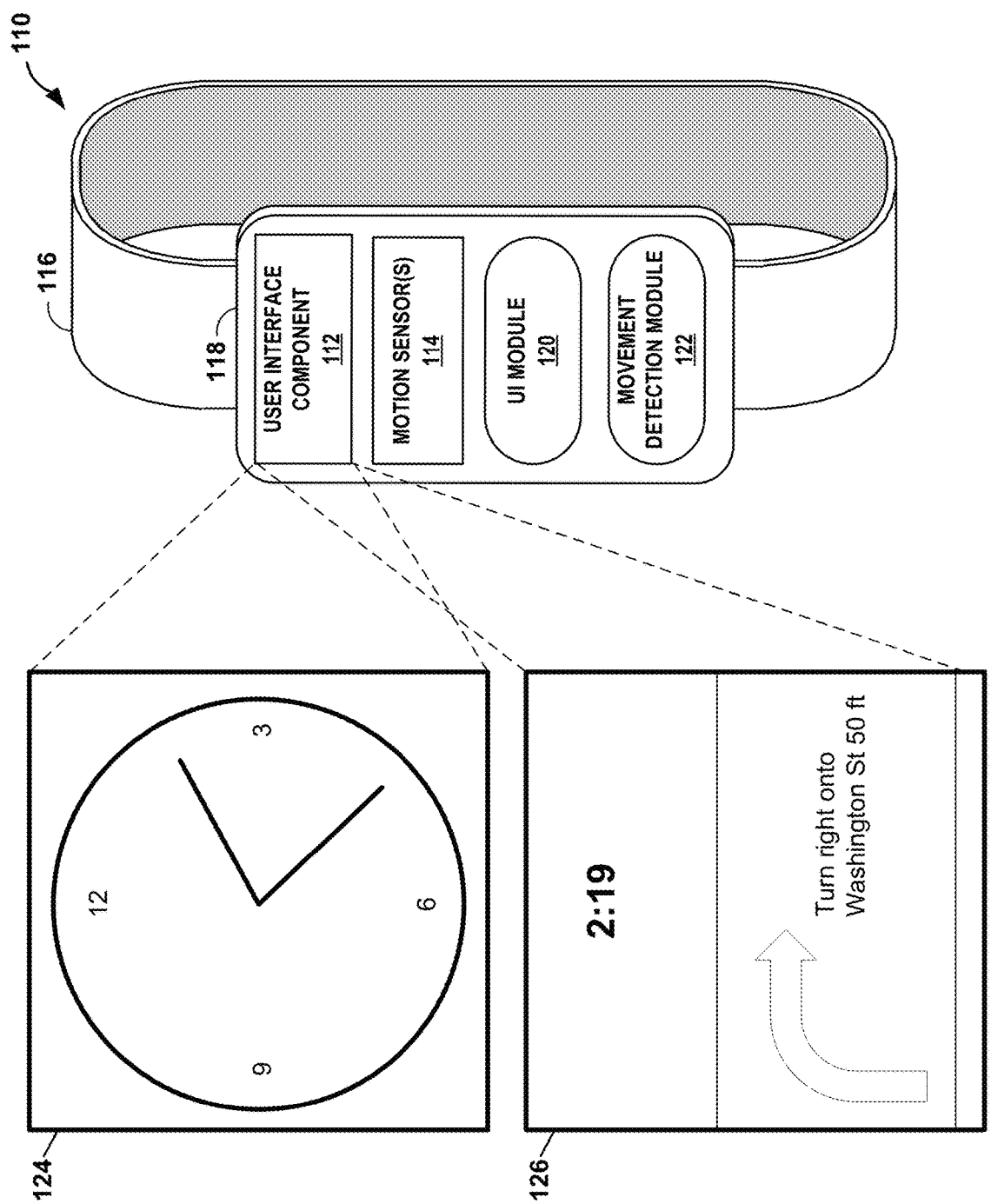
FIG. 1 is a conceptual diagram illustrating an example wearable computing device, in accordance with one or more aspects of the present disclosure.

FIG. 1 is a conceptual diagram illustrating wearable device 110, in accordance with one or more aspects of the present disclosure. In the example of FIG. 1, wearable device 110 is a computerized watch. However, in other examples, wearable device 110 is a computerized fitness band/tracker, computerized eyewear, computerized headwear, a computerized glove, computerized jewelry, computerized belt, etc. In other examples, wearable device 110 may be any type of mobile device that can attach to and/or be worn on a person's body or clothing. For example, wearable device 110 may include a tablet computer, mobile phone, personal digital assistant (PDA), game system or controller, media player, e-book reader, television platform, navigation system, remote control, or other mobile device that can easily be moved by a user in accordance with the below described techniques.

As shown in FIG. 1, wearable device 110 may include an attachment element 116 and a computing device 118. Computing device 118 includes a physical portion of a wearable device that houses a combination of hardware, software, firmware, and/or other components of wearable device 110. For example, FIG. 1 shows that computing device 118 may include a user interface component (UIC) 112, motion sensor(s) 114, a user interface (UI) module 120, and a movement detection module 122.

Attachment element 116 may include a physical portion of wearable device 110 that comes in contact with a body (e.g., skin, hair, clothing, etc.) of a user when the user is wearing wearable device 110. For example, in cases where wearable device 110 is a watch or bracelet, attachment element 116 may be a watchband that fits around a user's wrist and comes in contact with the skin of the user. In examples where wearable device 110 is eyewear or headwear, attachment element 116 may be a portion of the frame of the eyewear or headwear that fits around a user's head. In examples where wearable device 110 is a glove or ring, attachment element 116 may be the material of the glove or ring that conforms to one or more fingers of the user. In some examples, wearable device 110 can be grasped and held from computing device 118 and/or attachment element 116.

Modules 120 and 122 may perform operations described herein using software, hardware, firmware, or a mixture of hardware, software, and/or firmware residing in and/or executing at computing device 118. Computing device 118 may execute modules 120 and 122 with one or more processors located within a housing of computing device 118. In some examples, computing device 118 may execute modules 120 and 122 as one or more virtual machines executing on underlying hardware of computing device 118 located within a housing of computing device 118. Modules 120 and 122 may execute as one or more services or components of operating systems or computing platforms of computing device 118. Modules 120 and 122 may execute as one or more executable programs at application layers of computing platforms of computing device 118. In other examples, UIC 112, motion sensors 114, and/or modules 120 and 122 may be arranged remotely to computing device 118 and be remotely accessible to computing device 118, for instance, via peer-to-peer or client-server interaction by computing device 118 with one or more network services operating at a network or in a network cloud.

Motion sensors 114 include one or more motion sensors or input devices configured to detect indications of movement (e.g., data representing movement) associated with computing device 118. Examples of motion sensor 114 include one or more accelerometers, speed sensors, gyroscopes, tilt sensors, barometers, proximity sensors, ambient light sensors, cameras, microphones, or any and all other types of input devices or sensors that can generate data from which wearable device 110 can determine movement.

Motion sensors 114 may generate "raw" motion data when a user of computing device 118 causes attachment element 116 and/or computing device 118 to move. For example, as a user twists his or her wrist or moves his or her arm while wearing attachment element 116, motion sensors 114 may output raw motion data (e.g., indicating an amount of movement and a time at which the movement was detected), which is generated during the movement, to movement detection module 122. The motion data may indicate one or more characteristics of movement including at least one of an acceleration, a level of tilt, a direction, a speed, a degree of rotation, or a degree of orientation, to name a few examples.

Movement detection module 122 obtains motion sensor data generated by motion sensors 114 and may process the motion sensor data to identify or otherwise determine the specific types and characteristics of movement detected by motion sensors 114. In other words, movement detection module 122 may determine, based on motion sensor data, when, how, and in what direction(s) computing device 118 is moving. Movement detection module 122 may provide, based on motion data obtained from motion sensors 114, an indication (e.g., data) of movements of computing device 118 in a recognizable, predefined, pattern or profile of movement. For example, movement detection module 122 may alert (e.g., trigger an interrupt, send a message) UI module 120 when movement detection module 122 identifies motion data obtained from motion sensors 114 that at least approximately corresponds to one or more of predefined movements or spatial gestures. Movement detection module 122 may provide data about the detected movement to UI module 120. For instance, movement detection module 122 may provide to UI module 120 data that defines the particular predefined movement indicated by the motion data.

As described below, UI module 120 may cause computing device 118 to perform one or more operations based on movements of computing device 118 identified by movement detection module 122. For example, UI module 120 may alter the presentation of screen content (e.g., screen content 24 and/or 26) depending on predefined movements identified by movement detection module 122. For example, at any particular time, movement detection module 122 may obtain motion sensor 114 data, check the motion sensor data against one or more expected sensor data patterns or profiles that are normally detected by motion sensors 114 when computing device 118 moves in a certain direction, speed, acceleration, etc., and output a signal to UI module 120 that indicates the predefined movement of computing device 118 that movement detection module 122 identified based on the motion sensor data. UI module 120 may alter the electronic display presentation of UIC 112 depending on the predefined movement identified by movement detection module 122.

UIC 112 of computing device 118 may provide input and/or output functionality for computing device 118. UIC 112 may be implemented using one or more various technologies. For example, UIC 112 may function as input device using a presence-sensitive input screen, such as a resistive touch screen, a surface acoustic wave touch screen, a capacitive touchscreen, a projective capacitance touchscreen, a pressure sensitive screen, a resistive touch-sensitive display, a touchpad, an acoustic pulse recognition touchscreen, or another presence-sensitive display technology. UIC 112 may function as an output (e.g., display) device using any one or more display components, such as a liquid crystal display (LCD), a dot matrix display, a light emitting diode (LED) display, an organic light-emitting diode (OLED) display, e-ink, or similar monochrome or color displays capable of outputting visible information to a user of wearable device 110.

In some examples, UIC 112 may include a presence-sensitive display having a display component or layer and may receive tactile input from a user of wearable device 110 through a touch-sensitive component or layer. UIC 112 may receive indications of tactile input by detecting one or more gestures from a user (e.g., the user touching or pointing to one or more locations of UIC 112 with a finger or a stylus pen). UIC 112 may present output to a user via the display component. UIC 112 may present the output as graphical user interfaces (e.g., screen content 124 and 126), which may be associated with functionality provided by computing device 118.

In some examples, computing device 118 communicates with one or more other computing devices. For example, computing device 118 may communicate with a mobile telephone, a tablet computer, a wireless base station, an in-vehicle computing device, a so-called Internet of Things (IoT) device (e.g., a home automation device), and/or another type of computing device. Computing device 118 may communicate with the one or more computing devices in various ways. For example, computing device 118 may communicate with the one or more computing devices using one or more wired or wireless technologies, such as USB, BLUETOOTH, WI-FI, ZIGBEE, 3G, 4G-LTE, and so on.

Computing device 118 may receive notification data from the one or more computing devices with which computing device 118 communicates. The notification data may include data for alerting a user of wearable device 110 to the occurrence of various events. For example, the notification data may be for notifying the user of an incoming voice call, an incoming text message, a navigation message, a social media event, a calendar appointment, a sports score, a news alert, a reminder, traffic conditions, price quotes for securities, or other types of events. In some examples, computing device 118 may generate notification data without receiving the notification data from one or more other computing devices. For example, computing device 118 may generate notification data indicating a current heart rate of a user of wearable device 110 without communicating with any other computing device.

UI module 120 may process notification data to output an indication of the notification data for presentation (e.g., annunciate the notification data) by one or more output components, such as an electronic display, audio speaker, etc. The indication of the notification data may be a form of output that may be sensed in some way by a user of computing device 118. For example, UI module 120 may process the notification data to output a visual indication of the notification data for display by UIC 112. In some examples where UI module 120 outputs the indication of the notification data for display by UIC 112, the indication of the notification data may be contained within a "content card." In some examples, the content card occupies an entire viewable area of UIC 112. In other examples, the content card occupies only a portion of the viewable area of UIC 112. The content card may be conceptually similar to a physical note card in or on top of a stack of physical cards. Furthermore, in some examples, the indication of the notification data may include sound output by an audio speaker (e.g., a loudspeaker of computing device 118) such as a text-to-speech reading of an incoming text message.

In some examples, UI module 120 may output the indication of the notification data for presentation by the one or more output devices (e.g., annunciate at the one or more output devices) automatically in response to receiving the notification data. In some examples, UI module 120 may "receive" the notification data by UI module 120 generating the notification data. Thus, in some instances, receiving the notification data may imply receiving the notification from an outside source or generating the notification internally. For instance, UI module 120 may output the indication of the notification data for presentation by the one or more output components regardless of whether UI module 120 has received an indication of user input interpreted as requesting output of the indication of notification data. For example, UI module 120 may receive notification data corresponding to a chat message. In this example, UI module 120 may automatically provide an indication of the chat message for display by UIC 112 without waiting to receive a user input indicating that the user would like to view or hear the chat message.

When UIC 112 annunciates an indication of the notification data, UI module 120 may receive an indication of user input with regard to the notification data. UI module 120 may update the content displayed by UIC 112 in response to the indication of user input. Thus, when UIC 112 displays the indication of the notification data, the user of wearable device 110 may interact with the indication of the notification data. UI module 120 may receive indications of various types of user input with regard to the notification data. For example, UI module 120 may receive indications of touch gestures, spoken commands, movement gestures, and so on.

UI module 120 may perform various actions with regard to an indication of notification data in response to receiving an indication of user input with regard to the notification data. For example, UI module 120 may dismiss the indication of the notification data. In another example, the notification data corresponds to an invitation to join a voice call. In this example, UI module 120 may accept or decline the invitation to join the voice call in response to receiving an indication of user input.

As indicated above, UI module 120 may receive and interpret indications of touch or presence inputs detected at UIC 112 (e.g., as a user provides one or more touch gestures at one or more locations of UIC 112 at which screen content is displayed) and gesture movements identified by movement detection module 122 (e.g., from motion sensors 114). UI module 120 may cause computing device 118 to perform functions by relaying information about the detected inputs and identified movements to one or more associated platforms, operating systems, applications, and/or services executing at computing device 118.

Responsive to obtaining and relaying information about the detected inputs and identified movements, UI module 120 may receive information and instructions from the one or more associated platforms, operating systems, applications, and/or services executing at computing device 118 for generating and altering screen content associated with computing device 118 (e.g., screen content 124 and screen content 126). In this way, UI module 120 may act as an intermediary between the one or more associated platforms, operating systems, applications, and/or services executing at computing device 118 and various input and output components of computing device 118 (e.g., UIC 112, motion sensors 114, a speaker, a LED indicator, other output devices or components) to generate user interface output (e.g., a graphic, a flash of light, a sound, a haptic response) using computing device 118. In some examples, UI module 120 may interpret inputs and/or movement data detected at UIC 112 and by movement detection module 122, and in response to the inputs and/or movement data, cause UIC 112 to alter the presentation of screen content 124 and/or screen content 126. For instance, in one example, a user may cause computing device 118 and/or attachment element 116 of wearable device 110 to move. UI module 120 may alter the presentation of screen content 124 or screen content 126 in response to detecting movement.

In the example of FIG. 1, UIC 112 may output "ambient" screen content 124 for display or "interactive" screen content 126 for display. In the example of FIG. 1, ambient screen content 124 contains a clock face image. UI module 120 may update the clock face image of ambient screen content 124 such that the clock face image indicates a current time. Interactive screen content 126 may include one or more indications of notification data. As described elsewhere in this disclosure, the notification data may notify the user of wearable device 110 regarding particular events. In the example of FIG. 1, interactive screen content 126 includes a navigation alert.

Displaying interactive screen content 126 may consume more battery power than displaying ambient screen content 124. For example, UI module 120 may instruct UIC 112 to illuminate only those pixels of UIC 112 to display the clock face image of ambient screen content 124. UI module 120 may instruct UIC 112 to leave the remaining pixels of UIC 112 unilluminated. Furthermore, UI module 120 may instruct UIC 112 to illuminate pixels at a low luminosity level. In this way, computing device 118 may be able to output an indication of the current time while consuming relatively little battery power. In contrast, UI module 120 may instruct UIC 112 to illuminate any or all pixels of UIC 112 when displaying interactive screen content 126. Illuminating all pixels of UIC 112 may result in higher consumption of battery power.

A user of wearable device 110 may not be able to interact with content of ambient screen content 124. In contrast, the user may be able to interact with content of interactive screen content 126 (e.g., via voice commands, touch gestures, or spatial gestures). Because of the increased consumption of battery power associated with displaying interactive screen content 126, it may be desirable to display interactive screen content 126 only when the user of wearable device 110 is likely to be interested in interacting with wearable device 110.

Computing device 118 may output interactive screen content 126 for display in place of ambient screen content 124 responsive to receiving (i.e., receiving or generating) notification data. Additionally, computing device 118 may output interactive screen content 126 for display in place of ambient screen content 124 responsive to receiving an indication that wearable device 110 has moved in a manner consistent with a predefined pattern of movement (e.g., a wake-up movement). For instance, in an example (such as the example of FIG. 1) where wearable device 110 is a wristwatch, responsive to determining that a spatial movement of wearable device 110 detected by movement detection module 122 is consistent with the user rotating the user's wrist, UI module 120 of computing device 118 may output interactive screen content 126 for display in place of ambient screen content 124.

Many detected movements of wearable device 110 may generally, but not completely, correspond to the wake-up movement. In many situations where the movements of wearable device 110 only somewhat correspond to the wake-up movement, the user is not intending to interact with wearable device 110. For example, the wake-up movement may include a rotation of wearable device 110 consistent with the user rotating the user's wrist. In this example, wearable device 110 may rotate slightly as the user is typing or walking even though the user does not intend to perform the wake-up movement.

Computing device 118 displaying interactive screen content 126 may be distracting to the user if the user does not intend to interact with wearable device 110. For example, displaying interactive screen content 126 while the user is typing may break the user's concentration on what the user is writing. Accordingly, computing device 118 may display interactive screen content 126 in place of ambient screen content 124 only when a degree of correspondence between the detected movement of wearable device 110 and the wake-up movement is sufficiently great. Furthermore, displaying interactive screen content 126 in instances where the user of wearable device 110 does not intend to interact with wearable device 110 may be disruptive or annoying to others. For instance, the light associated with outputting interactive screen content 126 in a darkened theatre may disturb others.

As indicated above, interactive screen content 126 may include an indication of notification data (e.g., navigation data). Particular characteristics of notification data may make the notification data more or less important for the user to see. For example, notification data that was generated or received recently may be more important for the user to see at the present time than notification data that was generated or received at a more distant time in the past. In another example, notification data related to a current activity of the user (e.g., running) may be more important for the user to see at the present time than notification data that is not related to the current activity of the user (e.g., a social media connection request).

At least because some notification data is more important than other notification data, UI module 120 may adapt the sensitivity of computing device 118 to the wake-up movement. UI module 120 may adapt the sensitivity based on one or more characteristics of the notification data. Thus, if computing device 118 has received or generated notification data, and movement detection module 122 subsequently receives an indication from motion sensors 114 of a movement of wearable device 110, UI module 120 may determine whether to output an indication of the notification data for display on UIC 112. UI module 120 may make this determination based on a degree of correspondence between the detected movement of wearable device 110 and the predefined wake-up movement of wearable device 110 and also based on one or more characteristics of the notification data. The degree of correspondence may be a measure of similarity between the detected movement of wearable device 110 and the predefined wake-up movement of wearable device 110. In some examples, the degree of correspondence is a confidence score indicating how confident UI module 120 is that a detected movement of wearable device 110 corresponds to the wake-up movement.

In addition, UI module 120 may adapt, based on the one or more characteristics of the notification data, one or more aspects of how the indication of the notification data is presented (e.g., displayed). For example, UI module 120 may output, for display by UIC 112, an indication of notification data such that UIC 112 outputs the indication of the notification data with a particular amount of luminosity.

In general, luminosity may be the rate of emission of light. In this example, UI module 120 (or another computing device) may determine the amount of luminosity based on one or more characteristics of the notification data. The one or more characteristics of the notification data may be the same or different than the one or more characteristics used to adapt the sensitivity of computing device 118 to the wake-up movement. In other examples, UI module 120 may output, for playback by a speaker, an indication of the notification data such that the speaker outputs the indication of the notification data at a particular volume. Similar examples are possible with intensity, duration, and repetition of vibration, color of the displayed indication of the notification data, and so on.

In some examples where UI module 120 adapts one or more aspects of how the indication of the notification data is presented based on one or more characteristics of the notification data, the one or more characteristics of the notification data may include an elapsed time. The elapsed time may be the amount of time that has elapsed following computing device 118 receiving or generating the notification data. For instance, if the elapsed time exceeds a threshold amount of time, the amount of luminosity with which UIC 112 displays the indication of the notification data is lower than if the elapsed time does not exceed the threshold amount of time.

Furthermore, in some examples, UI module 120 may also adapt, based on a degree of correspondence between a detected movement of wearable device 110 and a predefined wake-up movement of wearable device 110, one or more aspects of how the indication of the notification data is presented. For example, UI module 120 may adapt, based on this degree of correspondence, the luminosity with which UIC 112 displays the indication of the notification data. For instance, in this example, the amount of luminosity may be positively related (e.g., proportionate) to the degree of correspondence between the detected movement of wearable device 110 and the predefined wake-up movement of wearable device 110.

In some examples, UI module 120 may adapt, based both on one or more characteristics of the notification data and the degree of correspondence between a detected movement of wearable device 110 and the predefined wake-up movement of wearable device 110, one or more aspects of how the indication of the notification data is presented. For example, UI module 120 (or another device) may determine an amount of luminosity with which to output an indication of notification data for display based at least in part on an elapsed time, an importance of the notification data, the degree of correspondence, and a gesture count. In this example, the elapsed time may be an amount of time that has elapsed following computing device 118 receiving or generating the notification data. Furthermore, in this example, the gesture count may indicate a number of times computing device 118 has received indications of detected movements of computing device 118 following computing device 118 receiving or generating the notification data and preceding a current time.

In some instances of the example provided in the previous paragraph, UI module 120 (or another component or device) may determine a score based on the elapsed time, an importance of the notification, the degree of correspondence, and the gesture count. For example, the score (S) may be determined as: $S=-(R*10)+I-(G*10)+C$. In this example, R indicates recency (e.g., the elapsed time), I indicates the importance (e.g., priority) of the notification, G indicates the gesture count, and C indicates a confidence score (e.g., the degree of correspondence). In this example, UI module 120 (or another component or device) may determine a luminosity level (e.g., a brightness level) as: $S/T*100$, where T is a threshold for when to illuminate UIC 112. UI module 120 may set the luminosity level of UIC 112 in accordance with the determined luminosity level.

Figure 2:
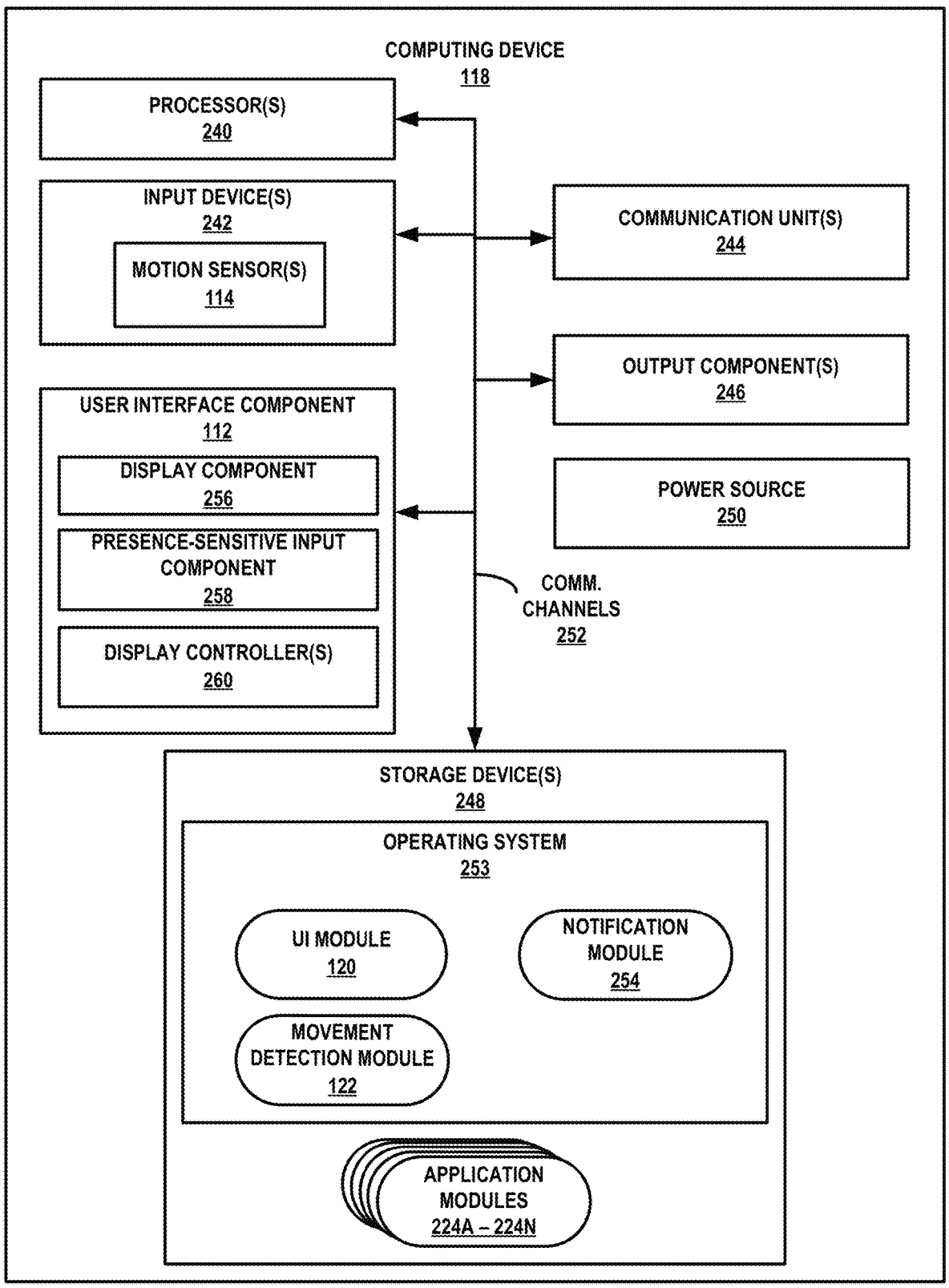
FIG. 2 is a block diagram illustrating an example computing device that is configured to display different arrangements of a visual stack of content cards, in accordance with one or more aspects of the present disclosure.

FIG. 2 is a block diagram illustrating an example computing device that is configured in accordance with one or more aspects of the present disclosure. This disclosure describes computing device 118 of FIG. 2 within the context of FIG. 1. FIG. 2 illustrates only one particular example of computing device 118. Many other examples of computing device 118 may be used in other instances and may include a subset of the components included in example computing device 118 or may include additional components not shown in FIG. 2.

As shown in the example of FIG. 2, computing device 118 includes UIC 112, one or more processors 240, one or more input devices 242, one or more communication units 244, one or more output components 246, and one or more storage devices 248. In the illustrated example, input devices 242 include motion sensors 114. Storage devices 248 of computing device 118 includes UI module 120, movement detection module 122, application modules 224A-224N (collectively referred to as "application modules 224"), and a notification module 254. Storage devices 248 also include an operating system 253. In the example of FIG. 2, operating system 253 includes UI module 120, movement detection module 122, and notification module 254. Communication channels 252 may interconnect each of the components 240, 242, 112, 244, 246, and 248 for inter-component communications (physically, communicatively, and/or operatively). In some examples, communication channels 252 may include a system bus, a network connection, an inter-process communication data structure, and/or any other method for communicating data. Furthermore, in the example of FIG. 2, computing device 118 includes a power source 250. Power source 250 may comprise one or more batteries, capacitors, or other types of components configured to provide electrical power to other components of computing device 118.

One or more input devices 242 of computing device 118 may receive environmental input. Examples of environmental input include tactile, audio, video, and movement sensor input. In some examples, input devices 242 include a presence-sensitive input device (e.g., a capacitance layer of a touch screen, a presence-sensitive display), mouse, keyboard, voice responsive system, video camera, microphone, or any other type of device for detecting input from a human or machine. In some examples, input devices 242 include physiological sensors for obtaining physiological parameter information associated with a user of computing device 118. For example, input devices 242 may include a heart monitor sensor, a temperature sensor, a galvanic skin response sensor, an accelerometer, a gyroscope, a pressure sensor, a blood pressure sensor, and/or any other sensor for measuring a physiological parameter that computing device 118 may use for determining a physiological condition of a user.

One or more output components 246 of computing device 118 may generate output to the environment around the computing device 118. Examples of environmental output include tactile, audio, and video output. In some examples, output devices 46 of computing device 118 include an electronic display layer of a presence-sensitive display, a sound card, a video graphics adapter card, an audio speaker, a cathode ray tube (CRT) monitor, a liquid crystal display (LCD), or any other type of device for generating output to a human or machine.

One or more communication units 244 of computing device 118 may communicate with external devices via one or more networks by transmitting and/or receiving network signals on the one or more networks. For example, computing device 118 may use communication units 244 to transmit and/or receive radio signals on a radio network such as a cellular radio network. Likewise, communication units 244 may transmit and/or receive satellite signals on a satellite network, such as a GPS network. Examples of communication units 244 include a network interface card (e.g., an Ethernet card), an optical transceiver, a radio frequency transceiver, a GPS receiver, or any other type of component or device that is able to send and/or receive information. Other examples of communication units 244 may include Bluetooth®, GPS, 3G, 4G, and Wi-Fi® radios found in mobile devices as well as Universal Serial Bus (USB) controllers.

In the example of FIG. 2, UIC 112 may be or may include a presence-sensitive input device. In some examples, a presence-sensitive input device may detect an object at and/or within a particular range of the presence-sensitive input device. As one example range, a presence-sensitive input device may detect an object, such as a finger or stylus that is within two inches (approx. 5 cm) or less of the presence-sensitive input device. In another example range, a presence-sensitive input device may detect an object six inches (approx. 15.24 cm) or less from the presence-sensitive input device, and other ranges are also possible. In some examples, a camera may be used to detect objects at particular distances, such as six inches (approx. 15.24 cm), from the presence-sensitive input device. The presence-sensitive input device may determine a location (e.g., an (x,y) coordinate or an (x,y,z) coordinate) of the presence-sensitive input device at which the object was detected. The presence-sensitive input device may determine the location selected by the input device using capacitive, inductive, and/or optical recognition techniques. In some examples, the presence-sensitive input device provides output to a user using tactile, audio, or video stimuli as described with respect to output components 246, and may be referred to as a presence-sensitive display.

In the example of FIG. 2, user interface component 112 comprises a display component 256, a presence-sensitive input component 258, and one or more display controllers 260. Display component 256 may comprise a screen at which information is displayed by user interface component 112 and presence-sensitive input component 258 may detect an object at and/or near display component 256. User interface component 112 may further include one or more display controllers 260 that may be responsible for managing the execution of the underlying hardware and embedded software and/or drivers associated with user interface component 112.

While illustrated as an internal component of computing device 118, UIC 112 may also be or include an external component that shares a data path with computing device 118 for transmitting and/or receiving input and output. For instance, in one example, UIC 112 is or includes a built-in component of computing device 118 located within and physically connected to the external packaging of computing device 118 (e.g., a screen on a mobile phone or wearable computing device). In another example, UIC 112 is or includes an external component of computing device 118 located outside and physically separated from the packaging of computing device 118 (e.g., a monitor, a projector, etc. that shares a wired and/or wireless data path with computing device 118).

One or more storage devices 248 within computing device 118 may store information for processing during operation of computing device 118. In some examples, storage devices 248 include a temporary memory, meaning that a primary purpose of storage devices 248 is not long-term storage. Storage devices 248 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

In some examples, storage devices 248 also include one or more computer-readable storage mediums. Storage devices 248 may be configured to store larger amounts of information than a temporary memory. Storage devices 248 may further be configured for long-term storage of information as non-volatile memory spaces and may retain information after power on/off cycles. Examples of non-volatile memories include magnetic hard discs, optical discs, floppy discs, flash memories, or forms of electrically programmable memories (EPROM) or electrically erasable and programmable memories (EEPROM). Storage devices 248 may store program instructions and/or data associated with modules 120, 122, 224, 253, and 254.

One or more processors 240 may implement functionality and/or execute instructions. For example, processors 240 may receive and execute instructions stored by storage devices 248 that cause computing device 118 to provide the functionality of operating system 253, including modules 120, 122, and 254. In addition, processors 240 may receive and execute instructions stored by storage devices 248 that cause computing device 118 to provide the functionality of application modules 224. The instructions executed by processors 240 may cause computing device 118 to store information within storage devices 248 during program execution. As shown in the example of FIG. 2, processors 240 may be coupled to output components 246 and motion sensors 114.

One or more application modules 224 may provide graphical information and instructions to UI module 120 that UI module 120 includes as content or information contained in a graphical representation of content cards. The content cards may include indications of notification data. For example, application module 224A may be a messaging application that executes at computing device 118 to provide computing device 118 with access to a messaging service. In this example, application module 224A may obtain information (e.g., via a network) that includes content of a message received by a messaging account associated with computing device 118. Furthermore, in this example, application module 224A may provide the content of the message (e.g., textual information) as well as instructions for causing UI module 120 to output a content card for display at UIC 112. Application modules 224B-224N may likewise each provide respective information and instructions for causing UI module 120 to present content.

Motion sensors 114 of computing device 118, as described previously with respect to FIG. 1, may detect movements of computing device 118. Movement detection module 122 may receive, from motion sensors 114, indications of the movements of computing device 118. Responsive to receiving an indication of a movement of computing device 118, movement detection module 122 may determine a confidence score. The confidence score may indicate a level of confidence that the movement of computing device 118 is a wake-up movement of computing device 118. In some examples, a low confidence score (e.g., 0), may indicate that the movement of computing device 118 does not closely correspond to (e.g., conform to) the wake-up movement of computing device 118. Likewise, in such examples, a high confidence score (e.g., 99) may indicate that the movement of computing device 118 closely corresponds to (e.g., conforms to) the wake-up movement of computing device 118. Movement detection module 122 may provide the confidence score to UI module 120.

Notification module 254 may process notification data for computing device 118. In some examples, such as the example of FIG. 2, notification module 254 may be part of operating system 253 of computing device 118. Furthermore, in some examples, notification module 254 may receive, via one or more of communication units 244, notification data from a computing device other than computing device 118. For example, computing device 118 may be communicatively coupled (e.g., paired with) another computing device, such as a smartphone, tablet, or in-vehicle computing system. In this example, the other computing device may send the notification to computing device 118.

In some examples, notification module 254 may receive notification data from one or more of application modules 224. Application modules 224 may operate locally on computing device 118. Hence, application modules 224 of computing device 118 may generate notification data. Furthermore, in some examples, notification module 254 may receive notification data from other portions of operating system 253 of computing device 118.

UI module 120 may determine, based on a plurality of factors, whether to output an interactive screen content for display at UIC 112. In some examples, the plurality of factors includes the confidence score (or another indication of a degree of correspondence between a movement of computing device 118 and a predefined wake-up movement of computing device 118). Furthermore, in some examples, the plurality of factors may include one or more characteristics of the notification data, such as recentness, gesture count, importance, and so on.

Figure 3:
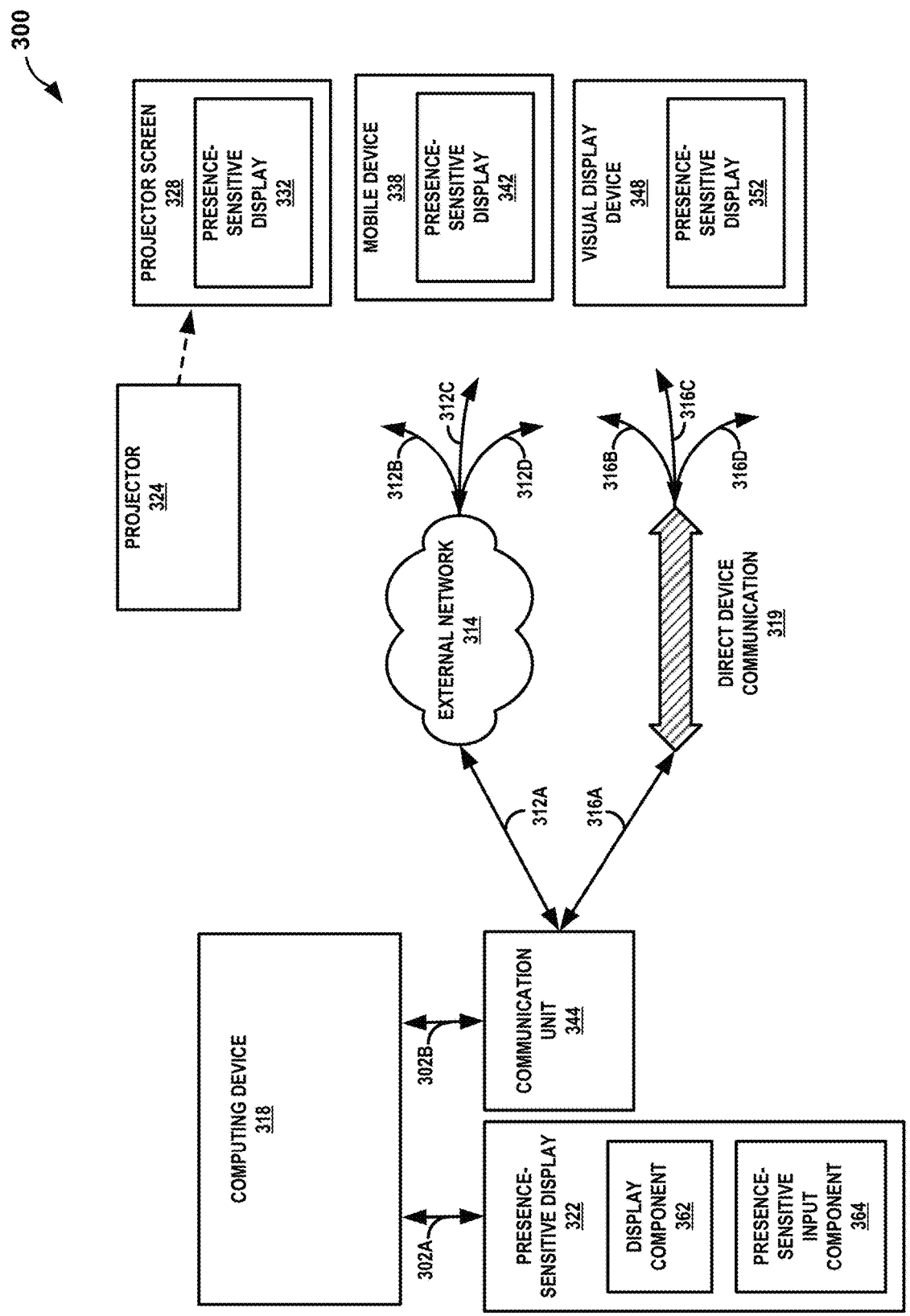
FIG. 3 is a conceptual block diagram illustrating an example computing device that outputs graphical content for display at a remote device, in accordance with one or more techniques of the present disclosure.

FIG. 3 is a conceptual block diagram 300 illustrating an example computing device 318 (e.g., computing device 118 of FIG. 1 and/or one or more processors 240 of FIG. 2) that outputs graphical content for display at a remote device. Graphical content, generally, may include any visual information that may be output for display, such as text, images, a group of moving images, etc. The example shown in FIG. 3 includes a computing device 318, presence-sensitive display 320, communication unit 344, projector 324, projector screen 425, mobile device 326, and visual display device 348. Although shown for purposes of example in FIGS. 1 and 2 as a stand-alone computing device, a computing device such as computing device 318 may, generally, be any component or system that includes a processor or other suitable computing environment for executing software instructions and, for example, need not include a presence-sensitive display.

As shown in the example of FIG. 3, computing device 318 may be a processor that includes functionality as described with respect to processors 240 in FIG. 2. In such examples, computing device 318 may be operatively coupled to presence-sensitive display 322 by a communication channel 302A, which may be or include a system bus or other suitable connection. In general, two devices may be operatively coupled when the devices are able to operate in coordination with each other. Computing device 318 may also be operatively coupled to communication unit 344, further described below, by a communication channel 302B, which may also be a system bus or other suitable connection. Although shown separately as an example in FIG. 3, computing device 318 may be operatively coupled to presence-sensitive display 322 and communication unit 344 by any number of one or more communication channels.

Presence-sensitive display 322 may include display component 362 and presence-sensitive input component 364. For example, display component 362 may receive data from computing device 318 and display the graphical content. In some examples, presence-sensitive input component 364 may determine one or more user inputs (e.g., continuous gestures, multi-touch gestures, single-touch gestures, etc.) at presence-sensitive display 322 using capacitive, inductive, and/or optical recognition techniques and send indications of such user input to computing device 318 using communication channel 302A. In some examples, presence-sensitive input component 364 may be physically positioned on top of display component 362 such that, when a user positions an input object (e.g., a finger, stylus) over a graphical element displayed by display component 362, the location at which presence-sensitive input component 364 corresponds to the location of display component 364 at which the graphical element is displayed. In other examples, presence-sensitive input component 364 may be positioned physically apart from display component 362, and locations of presence-sensitive input component 364 may correspond to locations of display component 362, such that input can be made at presence-sensitive input component 364 for interacting with graphical elements displayed at corresponding locations of display component 362.

As shown in FIG. 3, computing device 318 may also include and/or be operatively coupled with communication unit 344. Communication unit 344 may include functionality of communication units 244 as described in FIG. 2. Examples of communication unit 344 may include a network interface card, an Ethernet card, an optical transceiver, a radio frequency transceiver, or another type of device that are able to send and receive information. Other examples of such communication units may include Bluetooth®, 3G, and Wi-Fi® radios, Universal Serial Bus (USB) interfaces, etc. Computing device 318 may also include and/or be operatively coupled with one or more other devices, e.g., input devices, output devices, memory, storage devices, etc. that are not shown in FIG. 3 for purposes of brevity and illustration.

FIG. 3 also illustrates a projector 324 and projector screen 328. Other examples of projection devices may include electronic whiteboards, holographic display devices, and any other suitable devices for displaying graphical content. Projector 324 and projector screen 328 may include one or more communication units that enable the respective devices to communicate with computing device 318. In some examples, the one or more communication units may enable communication between projector 324 and projector screen 328. Projector 324 may receive data from computing device 318 that includes graphical content In response to receiving the data, projector 324 may project the graphical content onto projector screen 328. In some examples, projector 324 may determine one or more user inputs (e.g., continuous gestures, multi-touch gestures, single-touch gestures, double-bezel gestures) at projector screen 328 using optical recognition or other suitable techniques and send indications of such user input using one or more communication units to computing device 318. In such examples, projector screen 328 may be unnecessary, and projector 324 may project graphical content on any suitable medium and detect one or more user inputs using optical recognition or other such suitable techniques.

In some examples, projector screen 328 may include a presence-sensitive display 332. Presence-sensitive display 332 may include a subset of functionality or all of the functionality of UI component 112 as described in this disclosure. In some examples, presence-sensitive display 332 may include additional functionality. Projector screen 328 (e.g., an electronic whiteboard) may receive data from computing device 318 and display the graphical content. In some examples, presence-sensitive display 332 may determine one or more user inputs (e.g., continuous gestures, multi-touch gestures, single-touch gestures, double-bezel gestures) at projector screen 328 using capacitive, inductive, and/or optical recognition techniques and send indications of such user input to computing device 318 via one or more communication units.

FIG. 3 also illustrates mobile device 338 and visual display device 348. Mobile device 338 and visual display device 348 may each include computing and connectivity capabilities. Examples of mobile device 338 may include e-reader devices, convertible notebook devices, hybrid slate devices, etc. Examples of visual display device 348 may include other semi-stationary devices such as televisions, computer monitors, etc. As shown in FIG. 3, mobile device 338 may include a presence-sensitive display 342. Visual display device 348 may include a presence-sensitive display 352. For example, presence-sensitive display 352 may receive data from computing device 318 and display the graphical content. In some examples, presence-sensitive display 352 may determine one or more user inputs (e.g., continuous gestures, multi-touch gestures, single-touch gestures, double-bezel gestures) at projector screen using capacitive, inductive, and/or optical recognition techniques and send indications of such user input using one or more communication units to computing device 318.

As described above, in some examples, computing device 318 may output graphical content for display at presence-sensitive display 322, which is coupled to computing device 318 by a system bus or other suitable communication channel. Computing device 318 may also output graphical content for display at one or more remote devices, such as projector 324, projector screen 328, mobile device 338, and visual display device 348. For instance, computing device 318 may execute one or more instructions to generate and/or modify graphical content in accordance with techniques of the present disclosure. Computing device 318 may output the data that includes the graphical content to a communication unit of computing device 318, such as communication unit 344. Communication unit 344 may send the data to one or more of the remote devices, such as projector 324, projector screen 328, mobile device 338, and/or visual display device 348. In this way, computing device 318 may output the graphical content for display at one or more of the remote devices. In some examples, one or more of the remote devices may output the graphical content at a display component, such as a presence-sensitive display, that is included in and/or operatively coupled to the respective remote device.

In some examples, computing device 318 may not output graphical content at presence-sensitive display 101 that is operatively coupled to computing device 318. In other examples, computing device 318 may output graphical content for display at both a presence-sensitive display 322 that is coupled to computing device 318 by communication channel 302A, and at a display of one or more the remote devices. In such examples, the graphical content may be displayed substantially contemporaneously at each respective device. For instance, some delay may be introduced by the communication latency to send the data that includes the graphical content to the remote device. In some examples, graphical content generated by computing device 318 and output for display at presence-sensitive display 322 may be different than graphical content display output for display at one or more remote devices.

Computing device 318 may send and receive data using a suitable communication technique. For example, computing device 318 may be operatively coupled to external network 314 using network link 312A. Each of the remote devices illustrated in FIG. 3 may be operatively coupled to network external network 314 by one of respective network links 312B, 312C, and 312D. External network 314 may include network hubs, network switches, network routers, etc., that are operatively inter-coupled thereby providing for the exchange of information between computing device 318 and the remote devices illustrated in FIG. 3. In some examples, network links 312A-312D may be Ethernet, ATM or other network connections. Such connections may be wireless and/or wired connections.

In some examples, computing device 318 may be operatively coupled to one or more of the remote devices included in FIG. 3 using direct device communication 319. Direct device communication 319 may include communications through which computing device 318 sends and receives data directly with a remote device, using wired or wireless communication. That is, in some examples of direct device communication 319, data sent by computing device 318 may not be forwarded by one or more additional devices before being received at the remote device, and vice-versa. Examples of direct device communication 319 may include Bluetooth®, Near-Field Communication, Universal Serial Bus, infrared, etc. One or more of the remote devices illustrated in FIG. 3 may be operatively coupled with computing device 318 by communication links 316A-316D. In some examples, communication links 316A-316D may be connections using Bluetooth®, Near-Field Communication, Universal Serial Bus, infrared, etc. Such connections may be wireless and/or wired connections.

In accordance with one or more techniques of this disclosure, computing device 318 may output ambient screen content (e.g., ambient screen content 124 of FIG. 1) for display at one or more of display components 362, 332, 342, and 352. Furthermore, computing device 318 may receive, from one or more movement sensors operatively coupled to computing device 318, an indication of a movement of computing device 318. Responsive to receiving the indication of the movement of computing device 318, computing device 318 (or another computing device) may determine whether to output interactive screen content for display at one or more of display components 362, 332, 342, and 352. The interactive screen content may include an indication of notification data that was previously received or generated by computing device 318. Furthermore, in some examples, computing device 318 (or another computing device) may determine a level of illumination (e.g., luminosity) with which one or more of display components 362, 332, 342, and 352 output the interactive screen content for display. As described elsewhere in this disclosure, the determination of whether to output the interactive screen content and the determination of the level of illumination may be based on a plurality of factors. The factors may include the degree of correspondence between the detected movement of computing device 318 and a predefined wake-up movement, the recency of the notification data, a gesture count, an importance of the notification data, and so on.

Figure 4:
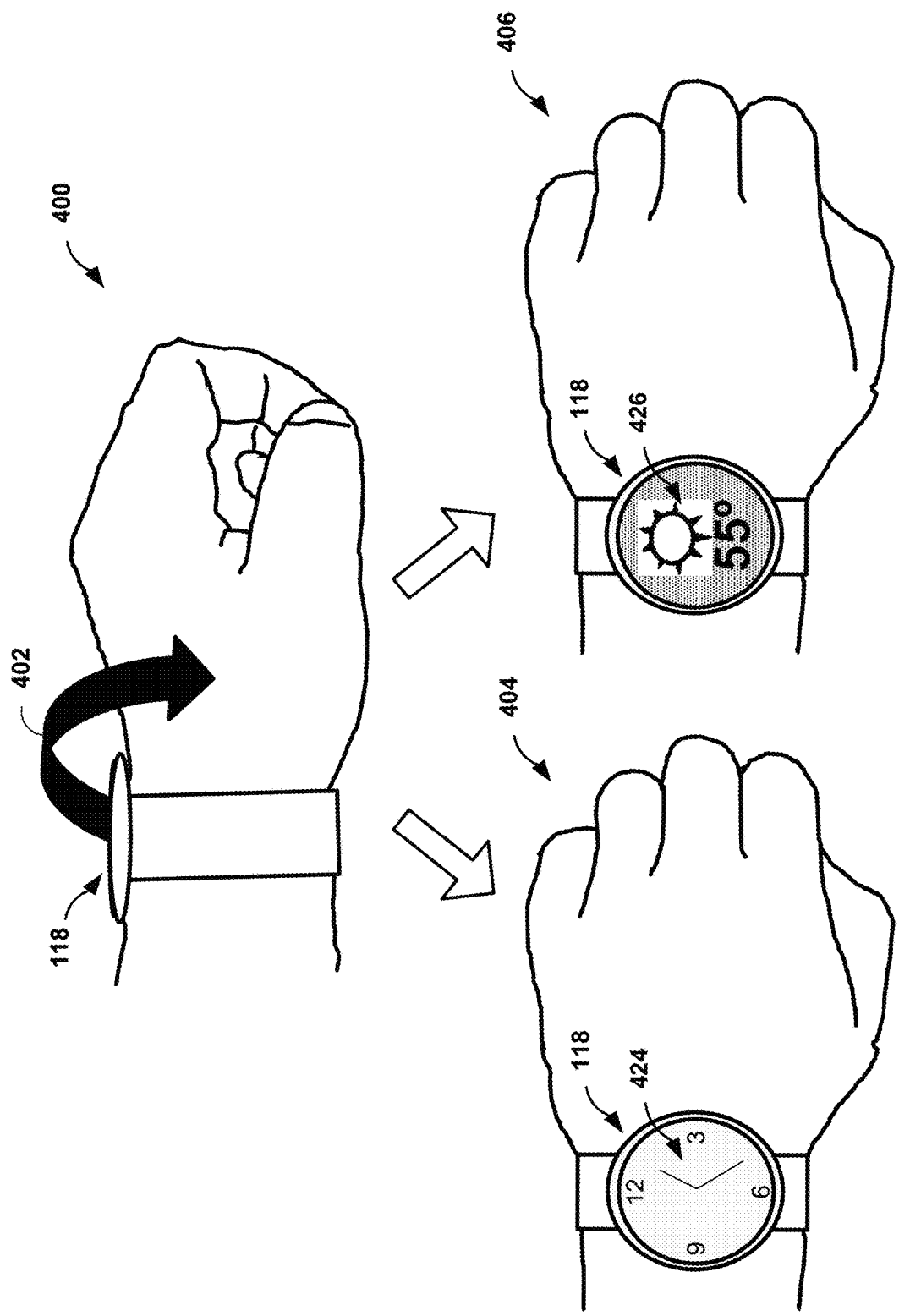
FIG. 4 is conceptual diagram illustrating an example behavior of a computing device in response to a movement of the computing device, in accordance with one or more aspects of the present disclosure.

FIG. 4 is conceptual diagram illustrating an example behavior of computing device 118 in response to a movement of computing device 118, in accordance with one or more aspects of the present disclosure. FIG. 4 is described below within the context of computing device 118 from FIGS. 1 and 2.

Portion 400 of FIG. 4 illustrates a view of computing device 118 as computing device 118 is being worn on a wrist of a user with the display of computing device 118 facing away from the user's point of view. From the view shown in portion 400 of FIG. 4, computing device 118 may receive an indication of a movement of computing device 118 after computing device 118 has received or generated notification data. In the example of FIG. 4, computing device 118 may receive an indication of a movement of computing device 118 in a direction and manner indicated by movement arrow 402. The movement indicated by movement arrow 402 may, for example, involve an approximately 90° twist of the user's wrist. The movement indicated by movement arrow 402 may result in a display (e.g., UIC 112) of computing device 118 being within a field of view of the user of computing device 118. Portions 404 and 406 of FIG. 4 illustrate computing device 118 after computing device 118 has moved in the direction and manner indicated by movement arrow 402.

Responsive to receiving an indication of a movement of computing device 118, computing device 118 (or another computing device) may determine whether to continue outputting ambient screen content 424 for display or to output interactive screen content 426 for display. Portion 404 of FIG. 4 shows computing device 118 outputting ambient screen content 424 for display. Ambient screen content 424 includes a clock face image. Portion 406 of FIG. 4 shows computing device 118 outputting interactive screen content 426 for display. Interactive screen content 426 may include an indication of notification data. In the example of FIG. 4, interactive screen content 426 includes an indication of notification data regarding current weather conditions.

The determination of whether to output ambient screen content 424 or interactive screen content 426 for display may be made based on a plurality of factors. In some examples, the plurality of factors may include a degree of correspondence between the actual movement of computing device 118 and the predefined wake-up movement of computing device 118. If the degree of correspondence between the actual movement of computing device 118 and the predefined wake-up movement of computing device 118 is low, computing device 118 may continue to output ambient screen content 424 for display. In contrast, if the degree of correspondence between the actual movement of computing device 118 and the predefined wake-up movement of computing device 118 is high, computing device 118 may output interactive screen content 426 of display.

Furthermore, in some examples, the plurality of factors may include one or more characteristics of the notification data. The one or more characteristics of the notification data may include an elapsed time between a time that computing device 118 received or generated the notification data and a current time. Furthermore, in some examples, the one or more characteristics of the notification data may include an importance of the notification data. In some examples, the one or more characteristics of the notification data may include a number of movements of computing device 118 (e.g., a gesture count) occurring between a time that computing device 118 received or generated the notification data and a current time or a time at which computing device 118 received an indication of a movement of computing device 118. In this way, computing device 118 may accept a broader range of movements as corresponding to the predefined wake-up movement, depending on one or more characteristics of the notification data. In other words, the degree of correspondence between the actual movement of computing device 118 and the predefined wake-up movement required for computing device 118 to output the interactive screen content may be greater or less, depending on one or more characteristics of the notification data.

Figure 5:
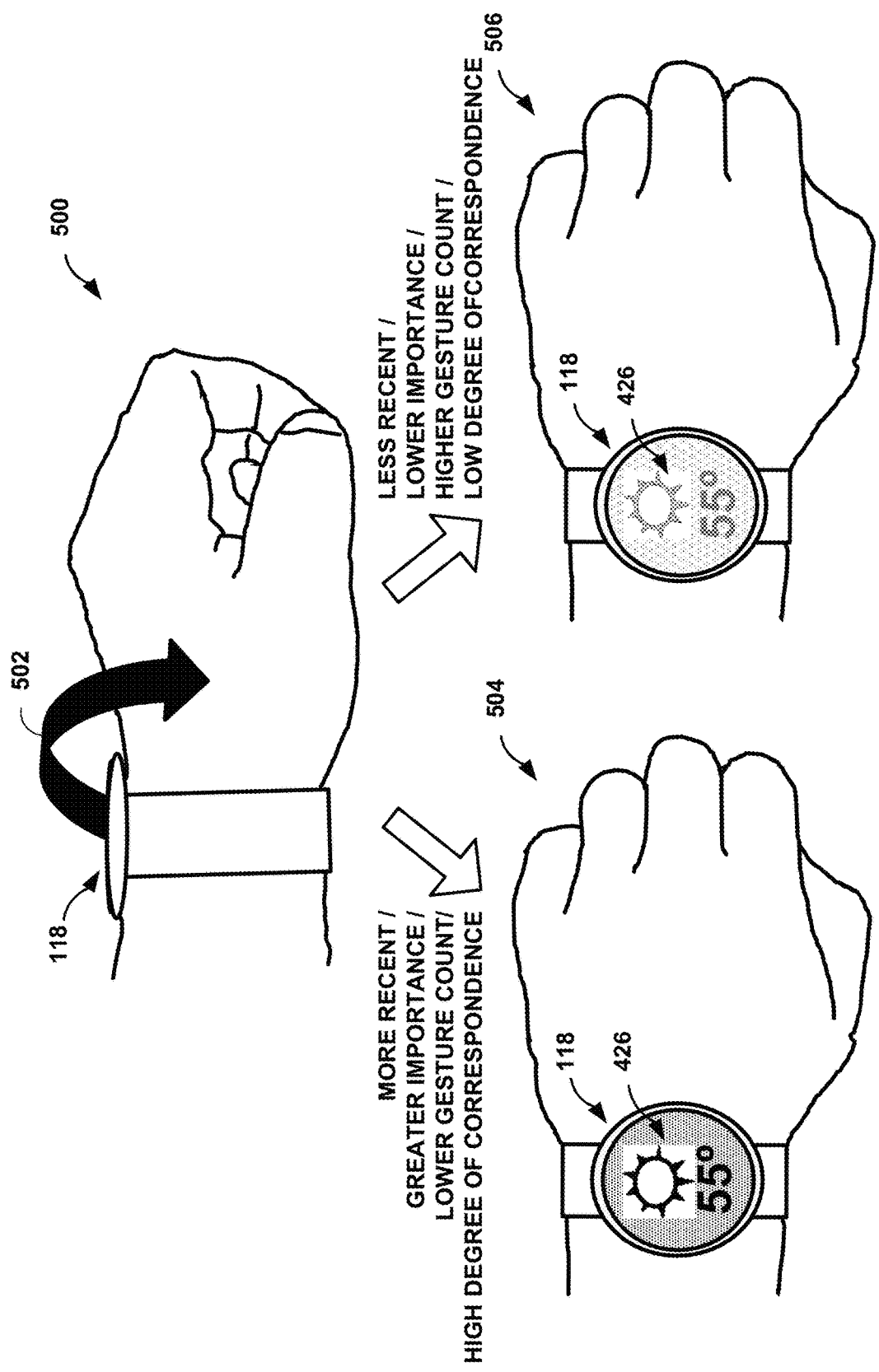
FIG. 5 is a conceptual diagram illustrating an example behavior of a computing device in response to a movement of the computing device, in accordance with one or more aspects of the present disclosure.

FIG. 5 is a conceptual diagram illustrating an example behavior of computing device 118 in response to a movement of computing device 118, in accordance with one or more aspects of the present disclosure. FIG. 5 is described below within the context of computing device 118 from FIGS. 1 and 2.

Portion 500 of FIG. 5 illustrates a view of computing device 118 as computing device 118 is being worn on a wrist of a user with the display of computing device 118 facing away from the user's point of view. From the view shown in portion 500 of FIG. 5, computing device 118 may receive an indication of a movement of computing device 118 after computing device 118 has received or generated notification data. In the example of FIG. 5, computing device 118 may receive an indication of a movement of computing device 118 in a direction and manner indicated by movement arrow 502. As in the example of FIG. 4, the movement indicated by movement arrow 502 may involve an approximately 90° twist of the user's wrist. The movement indicated by movement arrow 502 may result in a display (e.g., UIC 112) of computing device 118 being within a field of view of the user of computing device 118. Portions 504 and 506 of FIG. 5 illustrate computing device 118 after computing device 118 has moved in the direction and manner indicated by movement arrow 502.

As indicated elsewhere in this disclosure, responsive to receiving an indication of a movement of computing device 118, computing device 118 (or another computing device) may determine whether to continue outputting ambient screen content for display or to output interactive screen content 426 for display. Furthermore, if the determination is made to output interactive screen content 426 for display, computing device 118 (or another computing device) may determine an amount of luminosity with which to output interactive screen content 426 for display. In some examples, which are described in detail elsewhere in this disclosure, the determination whether to output interactive screen content 426 for display and the determination of the amount of luminosity with which to output interactive screen content 426 for display is the same determination.

In accordance with one or more aspects of this disclosure, the determination of the amount of luminosity with which to output interactive screen content 426 may depend on a plurality of factors. These factors may include a degree of correspondence between the indication of the movement of computing device 118 and a predefined wake-up movement. Furthermore, in some examples, the factors may include one or more characteristics of the notification data, such as an elapsed time, gesture count, importance of the notification data, and so on.

As shown in portion 504 of FIG. 5, computing device 118 may output interactive screen content 426 for display with greater luminosity. As shown in portion 506 of FIG. 5, computing device 118 may output interactive screen content 426 for display with lower luminosity. Furthermore, as indicated in the example of FIG. 5, factors weighing in favor of computing device 118 outputting interactive screen content 426 for display with greater luminosity include the notification data being more recent, the notification data having greater importance, the gesture count being relatively low, and/or the degree of correspondence between the indication of the movement of computing device 118 and the predefined wake-up movement of computing device 118 being relatively high. Conversely, as indicated in the example of FIG. 5, factors weighing in favor of computing device 118 outputting interactive screen content 426 for display with lower luminosity include the notification data being less recent, the notification data having lower importance, the gesture count being relatively high, and/or the degree of correspondence between the indication of the movement of computing device 118 and the predefined wake-up movement of computing device 118 being relatively low.

Figure 6:
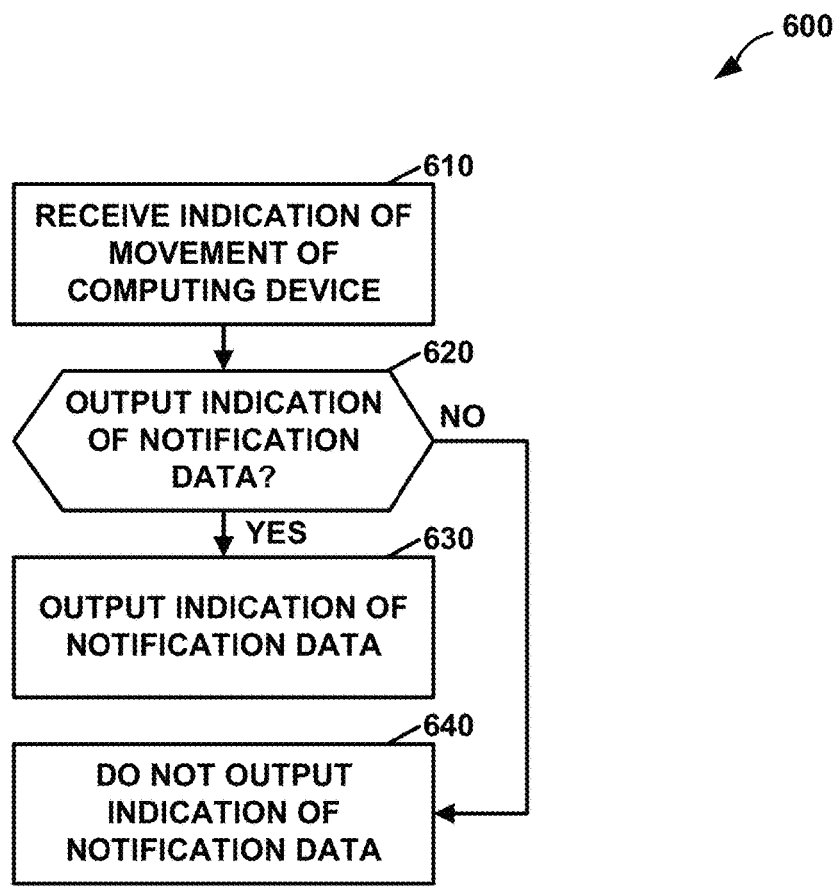
FIG. 6 is a flowchart illustrating an example operation of a computing device, in accordance with one or more techniques of the present disclosure.

FIG. 6 is a flowchart illustrating an example operation 600 of a computing device, in accordance with one or more techniques of the present disclosure. One or more processors of a computing device, such as computing device 118 illustrated in FIG. 1 and FIG. 2, may perform the operations of FIG. 6. For purposes of illustration, this disclosure describes FIG. 6 within the context of computing device 118 of FIGS. 1 and 2. Although this disclosure describes the operations of FIG. 6 with reference to computing device 118 of FIGS. 1 and 2, in other examples, another computing device or computing system may perform the operations of FIG. 6.

In the example of FIG. 6, computing device 118 may receive 610 an indication of a movement of computing device 118 detected by a motion sensor operatively coupled to computing device 118 (e.g., motion sensor 114). In the example of FIG. 1, movement detection module 122 may receive the indication of the movement of computing device 118 detected by motion sensors 114. Furthermore, in the example of FIG. 6, computing device 118 may determine 620 whether to output an indication of notification data. In other examples, another device such as a device paired with computing device 118 may determine whether to output the indication of notification data. The determination whether to output the indication of the notification data may be based on a degree of correspondence between the indication of the movement of the computing device and a predefined movement of computing device 118, and may further be based on one or more characteristics of the notification data as will be described in more detail with respect to FIGS. 7-8. For instance, FIG. 8, described below, describes the actions of determining whether to output the indication of the current notification for display, as well as a determination of a luminosity for the current notification, may be the same determination. In the example of FIG. 1, UI module 120 may determine whether to output the indication of the notification data. Although the example of FIG. 6 shows computing device 118 determining whether to output the indication of the notification data, in other examples, other computing devices (e.g., a mobile phone communicatively coupled to computing device 118) may receive an indication of the movement of computing device 118 and perform the determination of whether to output the indication of the notification data.

In some examples, the one or more characteristics of the notification data include an elapsed time. The elapsed time may be an amount of time that has elapsed from after computing device 118 receives or generates the notification data to when the computing device receives the indication of the movement of computing device 118. In some such examples, if the elapsed time exceeds a threshold amount of time, the determination to output the indication of the notification may be based on a higher degree of correspondence between the indication of the movement of computing device 118 and the predefined movement of computing device 118 than if the elapsed time does not exceed the threshold amount of time. For instance, for the same movement of computing device 118, computing device 118 may or may not output the indication of the notification in response, depending on whether the elapsed time exceeds or does not exceed the threshold amount of time.

Furthermore, in some examples, the one or more characteristics of the notification data include a priority level (e.g., an importance level) of the notification data. As described in detail elsewhere in this disclosure, the priority level of the notification data may be determined based on data regarding the user of computing device 118. The data regarding the user of computing device 118 may include various types of data, such as a current or past location of computing device 118, data (e.g., sensory data) indicative of a current or past activity of the user of computing device 118, calendar information for the user of computing device 118, and so on. Examples of current or past activities of the user may include driving, walking, running, swimming, travelling, sleeping, and so on. Furthermore, in some examples, the priority level of the notification data is determined based on content of the notification data. For instance, the notification data may include data indicating the priority level of the notification data such as an "urgent" flag or the term "ASAP" in a subject or text.

Responsive to a determination 620 to output the indication of the notification data ("YES" branch of 620), computing device 118 may cease display of the ambient screen content 124 and output 630, for presentation at an output device operatively coupled to computing device 118 (e.g., UIC 112), the indication of the notification data. In the example of FIG. 1, UI module 120 may output the indication of the notification data for display at UIC 112. Responsive to a determination 620 not to output the indication of the notification data ("NO" branch of 620), computing device 118 does not output 640 the indication of the notification data. The output device may output indication of the notification data in various ways. For example, the output device may include a speaker and outputting the indication of the notification data may include outputting an audible (e.g. verbal or tone) indication of the notification data. In some examples, the output device may include a display component and outputting the indication of the notification data may include outputting a visible (e.g., text or icon) indication of the notification data for display.

Although not shown in FIG. 6, in some examples where computing device 118 outputs the indication of the notification data for display at a display component (e.g., UIC 112), computing device 118 may output, for display at the display component, the indication of the notification data such that the display component displays the indication of the notification data with a particular amount of luminosity. The amount of luminosity may be determined based on a set of one or more characteristics of the notification data that may be the same or different from the set of characteristics of the notification data used to determine whether to output the indication of the notification data. For instance, the one or more characteristics of the notification data used to determine the particular amount of luminosity may include an elapsed time, the elapsed time being an amount of time that has elapsed after computing device 118 receives or generates the notification data. In some examples, if the elapsed time exceeds a threshold amount of time, the amount of luminosity is lower than if the elapsed time does not exceed the threshold amount of time. Furthermore, in some examples, the particular amount of luminosity is determined based at least in part on the elapsed time, an importance of the notification data, the degree of correspondence, and a gesture count. In such examples, the gesture count may indicate a number of times computing device 118 has received indications of movements of computing device 118 detected after computing device 118 receives or generates the notification data and preceding a current time (or other time).

The set of characteristics of the notification data used to determine the particular amount of luminosity may also include a priority level of the notification data. The priority level of the notification data may be determined based on data regarding the computing device and/or data regarding the user of the computing device, such as a current or past location of the computing device, sensory data indicative of a current or past activity of the user of the computing device, or calendar information for the user of the computing device. In some examples, the priority level of the notification data is determined based on content of the notification data.

Furthermore, in some examples where the output device is a display component, computing device 118 may output, for display at the display component, the indication of the notification data such that the display component displays the indication of the notification data with an amount of luminosity. In such examples, the amount of luminosity may be positively related to the degree of correspondence between the indication of the movement of computing device 118 and the predefined movement of computing device 118. In other words, the amount of luminosity may increase as the degree of correspondence increases. In a different implementation, the amount of luminosity may increase as the degree of correspondence decreases.

Figure 7:
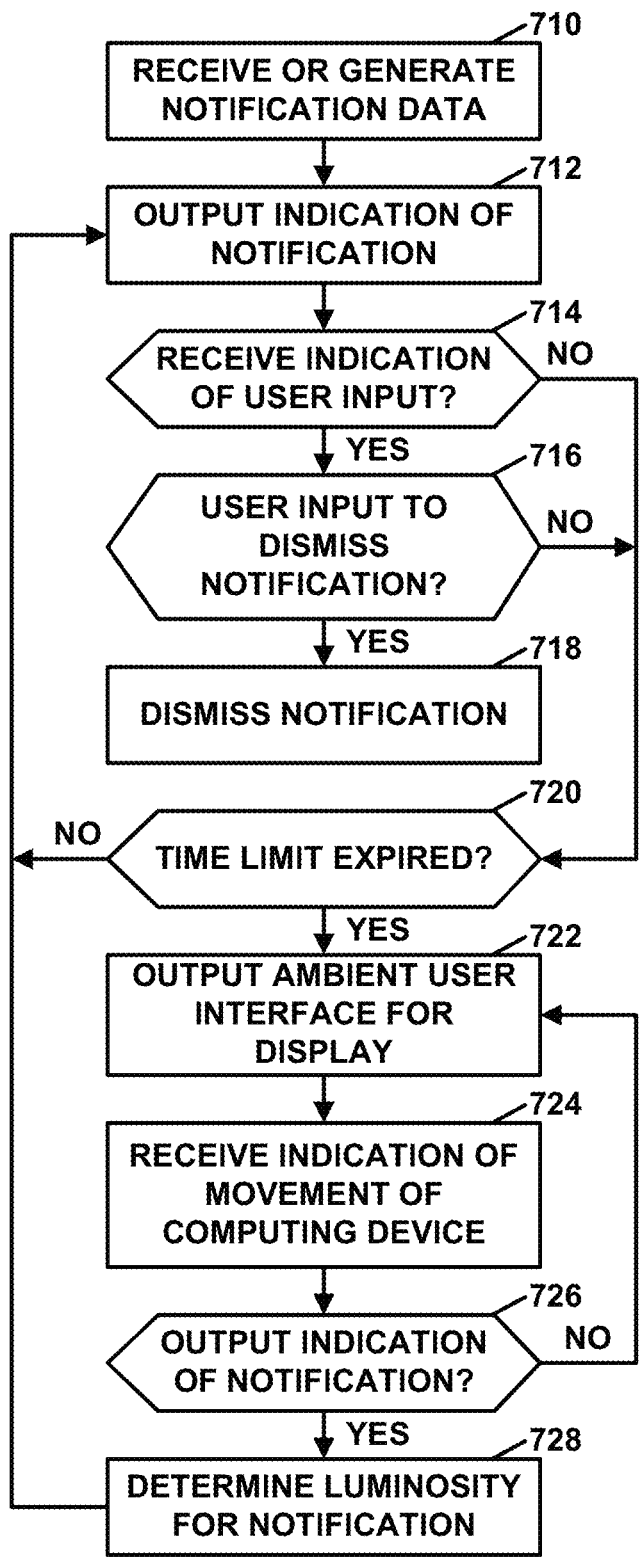
FIG. 7 is a flowchart illustrating an example operation of a computing device, in accordance with one or more techniques of the present disclosure.

FIG. 7 is a flowchart illustrating an example operation of a computing device, in accordance with one or more techniques of the present disclosure. FIG. 7 is an example of more specialized operation including the actions of FIG. 6, but including additional actions and involving displayed output. For instance, action 724 of FIG. 7 may correspond to action 610 of FIG. 6, action 726 of FIG. 7 may correspond to action 620 of FIG. 6, action 712 of FIG. 7 may correspond to action 630 of FIG. 6, and the "NO" branch of action 726 of FIG. 7 may correspond to action 640 of FIG. 6.

The operations of FIG. 7 may be performed by one or more processors of a computing device, such as computing device 118 illustrated in FIG. 1 and FIG. 2. For purposes of illustration, FIG. 7 is described below within the context of computing device 118 of FIGS. 1 and 2. For instance, the actions of FIG. 7 may be performed by UI module 120 of FIG. 1. Although the operations of FIG. 7 are described with reference to computing device 118 of FIGS. 1 and 2, in other examples, the operations of FIG. 7 may be performed by another computing device or computing system, such as computing device 318 of FIG. 3 that includes more or fewer components than computing device 118. Furthermore, the operations of FIG. 7 are described with reference to outputting an indication of notification data for display. However, in other examples, indications of notification data may be output in other manners. This disclosure may use the term "notification" as a shorthand for "notification data."

In the example of FIG. 7, computing device 118 may receive or generate 610 notification data (i.e., a current notification). Responsive to receiving or generating the current notification, computing device 118 may output 712 an indication of the current notification for display. For example, computing device 118 may output interactive screen content for display at UIC 112. In this example, the interactive screen content may include the indication of the current notification.

Furthermore, while the indication of the current notification is being displayed, computing device 118 may determine whether computing device 118 has received 714 an indication of user input. Responsive to determining that computing device 118 has received an indication of user input ("YES" branch of 714), computing device 118 may determine 716 whether the user input instructs dismissal of the current notification. In various examples, computing device 118 may receive various indications of user input to dismiss the indication of the current notification. For instance, in one example, the user input to dismiss the indication of the current notification may involve a rightward swiping gesture of an input object (e.g., a finger, stylus) on the presence-sensitive input component 258 of FIG. 2. In another example, the user input to dismiss the indication of the current notification may include a voice command (e.g., "dismiss").

Responsive to receiving an indication of user input to dismiss the current notification ("YES" branch of 716), computing device 118 may dismiss 718 the current notification. In various examples, computing device 118 may perform various actions when computing device 118 dismisses the indication of the current notification. For instance, in one such example, if computing device 118 has received or generated one or more additional notifications that computing device 118 has not yet displayed, computing device 118 may output one or more of the additional notifications for display in place of the current notification. In this example, if there are a plurality of additional notifications that computing device 118 has not yet dismissed, computing device 118 may determine, based on one or more criteria, which of the one of the additional notifications to output for display in place of the current notification. The one or more criteria may include a chronological order in which computing device 118 received or generated the notifications, the relative importance of the additional notifications, and/or various other heuristics for sorting the additional notifications. In some examples, computing device 118 may receive an indication from a second computing device (e.g., a server device) to dismiss a notification. In such examples, the second computing device may send the indication to computing device 118 responsive to an indication to dismiss the notification received by the second computing device from a third computing device (e.g., a mobile phone, tablet computer) that is associated with a user of computing device 118.

In the example of FIG. 7, if computing device 118 does not receive an indication of user input ("NO" branch of 714) or if the user input does not instruct dismissal of the current notification ("NO" branch of 716), computing device 118 may determine 720 whether a time limit has expired. The time limit may expire when a particular amount of time (e.g., 5 seconds) has elapsed following computing device 118 outputting 712 the indication of the current notification for display and computing device 118 not receiving any indication of user input. Responsive to determining that the time limit has not expired ("NO" branch of 720), computing device 118 may continue to output 712 the indication of the current notification. Thus, computing device 118 may continue to perform actions 712 through 720 until computing device 118 dismisses the current notification or the time limit has expired.

Although not shown in the example of FIG. 7 for conciseness, computing device 118 may perform other actions in response to indications of other user inputs received while the indication of the current notification is displayed. For example, computing device 118 may have received or generated additional notifications that the user has not yet dismissed. In this example, responsive to receiving an indication of an upward swiping gesture on the presence-sensitive input component 258 of FIG. 2, computing device 118 may output an indication of an additional notification for display in place of the indication of the current notification. In this example, computing device 118 treats the additional notification as a replacement "current" notification for purposes of the operation of FIG. 7.

Furthermore, in some examples, computing device 118 may perform one or more actions associated with the current notification in response to receiving an indication of a leftward swiping gesture on the presence-sensitive input component 258 of FIG. 2. For instance, in one such example, the current notification may correspond to an incoming voice call. In this example, computing device 118 may accept the incoming voice call in response to receiving an indication of a leftward swiping gesture. In another example, the current notification may correspond to an incoming chat message. In this example, responsive to receiving an indication of a leftward swiping gesture, computing device 118 may output screen content for display that prompts the user to speak a response to the incoming chat message.

In the example of FIG. 7, responsive to determining that the time limit has expired ("YES" branch of 720), computing device 118 may output 722 ambient screen content (e.g., ambient screen content 124 of FIG. 1) for display in place of the indication of the current notification. Subsequently, computing device 118 may receive 724 an indication of a movement of computing device 118 from one or more motion sensors operatively coupled to computing device 118.

Responsive to receiving the indication of the movement of computing device 118, computing device 118 may determine 726 whether to output the indication of the current notification. In other examples as mentioned previously, a computing device other than computing device 118 may determine whether to output the indication of the current notification. However, for ease of explanation, the discussion of FIG. 7 assumes that computing device 118 determines whether to output the indication of the current notification. Computing device 118 may determine whether to output the indication of the current notification based on a degree of correspondence between the indication of the movement of computing device 118 and a predefined wake-up movement of computing device 118, as well as one or more characteristics of the current notification.

Furthermore, in the example of FIG. 7, responsive to making 726 the determination not to output the indication of the current notification ("NO" branch of 726), computing device 118 may continue to output 722 the ambient screen content for display. Hence, computing device 118 does not output the indication of the notification data. (See FIG. 6 block 640.) On the other hand, responsive to making 726 the determination to output the indication of the current notification ("YES" branch of 726), computing device 118 may determine 728 a luminosity level for the current notification. Computing device 118 may output 712 the indication of the current notification for display using the luminosity level for the current notification. The luminosity level for the current notification may be an amount of luminosity with which the indication of the current notification is to be displayed. In various examples, computing device 118 may determine the luminosity level for the current notification in various ways. For instance, computing device 118 may determine the luminosity level for the current notification based on the degree of correspondence between the indication of the movement of computing device 118 and the wake-up movement of computing device 118, and also based on one or more characteristics of the current notification. The characteristics of the current notification may include the characteristics of the current notification described in other examples of this disclosure. In some examples, such as the example of FIG. 8 described below, the actions of determining whether to output the indication of the current notification for display and the determination of the luminosity for the current notification may be the same determination.

Although not illustrated in the example of FIG. 7 for conciseness, in some examples, computing device 118 may also output the indication of the current notification for display responsive to receiving an indication of a tapping gesture (e.g., at UIC 112 of computing device 118). In at least some such examples, responsive to receiving the indication of the tapping gesture on a presence-sensitive input component 258 of FIG. 2, computing device 118 may output an indication of the current notification with a default amount of luminosity. Computing device 118 (or another computing device) may determine the default amount of luminosity based at least in part on an ambient light level detected by a sensor operatively coupled to computing device 118.

Thus, in one example, computing device 118 may be part of a watch (e.g., a smartwatch). In this example, computing device 118 may receive 710 notification data, such as a chat message. In response, computing device 118 may output 712 the interactive screen content for display for 5 seconds. The user of computing device 118 may not see this because the user's hand may be down by the user's side. A few minutes later (see FIG. 7 block 720 "YES" branch), when the user lifts 724 the user's hands, computing device 118 may turn on the display (e.g., output the interactive screen content for display with the chat message) because there is a new message that the user has not dismissed. In this example, the user does not interact with computing device 118 and puts down the user's arm to the side again. The next time the user moves up the user's hands, the watch turns on again with a slightly lower brightness and with a slightly higher threshold towards the natural human position "looking at watch."

Figure 8:
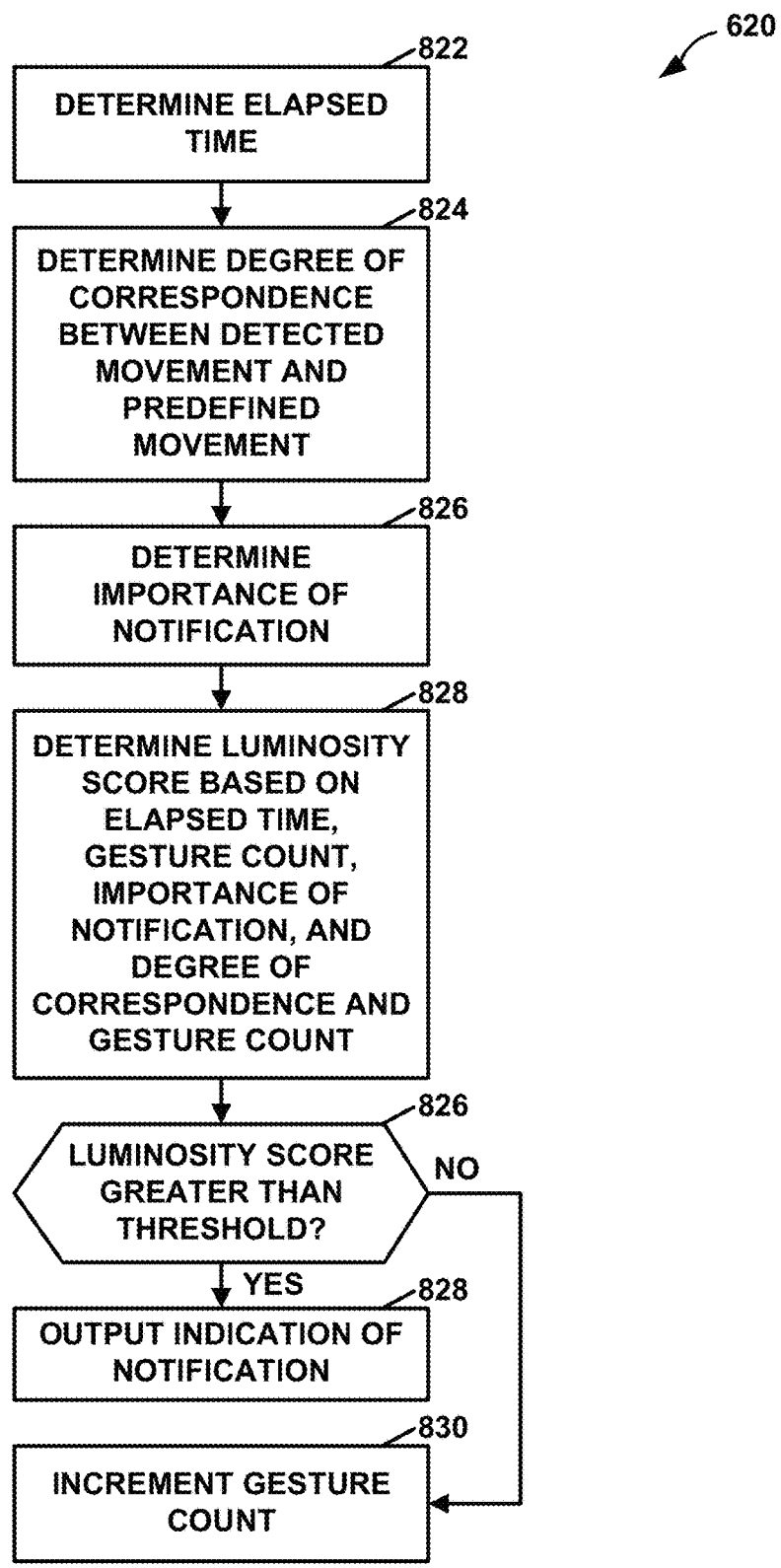
FIG. 8 is a flowchart illustrating an example operation of a computing device to determine whether to output an indication of notification data for display, in accordance with one or more techniques of the present disclosure.

FIG. 8 is a flowchart illustrating an example operation 620 of a computing device to determine whether to output an indication of notification data for display, in accordance with one or more techniques of the present disclosure. The operation of FIG. 8 may be performed by one or more processors of a computing device, such as computing device 118 illustrated in FIG. 1 and FIG. 2. For purposes of illustration, FIG. 8 is described below within the context of computing device 118 of FIGS. 1 and 2. For instance, the actions of FIG. 8 may be performed by UI module 120 of FIG. 1. Although the operations of FIG. 8 are described with reference to computing device 118 of FIGS. 1 and 2, in other examples, the operations of FIG. 8 may be performed by another computing device or computing system, such as computing device 318 of FIG. 3 that includes more or fewer components than computing device 118. Operation 620 of FIG. 8 may be an example of determining whether to output an indication of notification data in action 620 of FIG. 6.

In the example of FIG. 8, computing device 118 may determine 822 an elapsed time for a current notification. The elapsed time for the current notification may be an amount of time that has elapsed after computing device 118 received or generated the current notification (see FIG. 7 block 710). In addition, responsive to receiving the indication of the movement of computing device 118, computing device 118 may determine 824 a degree of correspondence between the indication of the movement of computing device 118 and a predefined movement of computing device 118 (e.g., a wake-up movement of computing device 118).

Furthermore, in the example of FIG. 8, computing device 118 may determine 826 an importance (i.e., priority level) of the current notification. In various examples, computing device 118 may determine the importance of the current notification in various ways. For instance, in some examples, computing device 118 may determine the importance of the current notification based at least in part on contextual data. The contextual data may include data regarding a current location of computing device 118, a current ambient noise level detected by a sensor operatively coupled to computing device 118, a current ambient light level detected by a sensor operatively coupled to computing device 118, and other data regarding the current location and environment of computing device 118. Furthermore, in some examples, the contextual data may include the current time. Additionally, in some examples, the contextual data may include data regarding the user of computing device 118. The data regarding the user of computing device 118 may include data regarding a current activity of the user (e.g., walking, sitting, running, cycling, rowing, driving, travelling by particular modes of transportation (e.g., bus, car, airplane, train, boat)). Furthermore, in some examples, the data regarding the user of computing device 118 may include data associated with (e.g., regarding) events on a calendar of the user. In some examples, the data regarding the user of computing device 118 may include data regarding a social graph of the user. For instance, computing device 118 may assign greater importance to notification data associated with the user's spouse or children than to notification data associated with other people.

In some examples, computing device 118 may determine the importance of the notification data based on the content of the current notification. For example, the current notification may include data indicating a priority or importance of the current notification. For instance, in this example, notification data related to weather conditions may include an indicator of high priority if the notification data is associated with severe weather.

In some instances, the importance of the current notification may change between times when computing device 118 receives indications of movements of computing device 118. For example, notification data associated with traffic conditions may be important while the user is driving, but the same notification data may be less important after the user has stopped driving.

Furthermore, in other examples, computing device 118 may determine the importance of the notification data prior to receiving an indication of the movement of computing device 118. In some examples, determining the importance of the notification data may involve determining an importance score for the current notification. In some such examples, higher importance scores may be associated with notifications that are more important (due to factors such as sender information, textual analysis of the notification, and notification flags) and lower importance scores may be associated with notifications that are less important. The examples provided above for determining the importance of the current notification may be applicable in other implementations and examples of this disclosure other than the example of FIG. 8.

Continuing reference is now made to the example of FIG. 8. Computing device 118 may determine 828 a luminosity score for the current notification, based at least in part on the elapsed time for the current notification, a gesture count for the current notification, and the degree of correspondence. The gesture count for the current notification may indicate a number of times computing device 118 has received an indication of a movement of computing device 118 following computing device 118 receiving or generating the current notification. Computing device 118 may then determine 830 whether the luminosity score for the current notification is greater than a threshold. Responsive to determining 830 that the luminosity score for the current notification is greater than the threshold ("YES" branch of 830), computing device 118 may output 832 the indication of the current notification for display such that the indication of the current notification has a luminosity determined by the luminosity score. Thus, in the example of FIG. 8, the determination whether to output the interactive screen content, which includes the current notification, for display and the determination of the amount of luminosity with which to output interactive screen content 426 for display is the same determination.

Responsive to determining 830 that the luminosity score for the current notification is not greater than the threshold ("NO" branch of 830), computing device 118 may increment 834 the gesture count for the current notification and continue outputting the indication of the current notification for display. For example, computing device 118 may add one, or another number, to the gesture count for the current notification. In this way, computing device 118 may maintain the gesture count for the current notification for use when computing device 118 receives a subsequent indication of a movement of computing device 118. Computing device 118 may repeat the operation of FIG. 8 in response to computing device 118 receiving another indication of a movement or motion of computing device 118.

Furthermore, although not illustrated in the examples of FIG. 7 and FIG. 8 for conciseness, computing device 118 may receive or generate additional notifications after computing device 118 received or generated the current notification and prior to computing device 118 dismissing the indication of the current notification. For ease of explanation, the notification that is currently the current notification may be referred to herein as the first notification and the additional notification may be referred to herein as the second notification. Responsive to computing device 118 receiving or generating the second notification, the first notification may become a non-current notification and the second notification may become the current notification. Computing device 118 may perform the operations of FIG. 7 and FIG. 8 with respect to the new current notification (i.e., the second notification). However, computing device 118 may continue to maintain and/or update the elapsed time for the first notification, the importance of the first notification, and the gesture count for the first notification in response to computing device 118 receiving indications of movements of computing device 118. Thus, if the first notification again becomes the current notification (e.g., after dismissal of the second notification), computing device 118 may determine the luminosity score for the first notification based on the time elapsed and the number of movements of computing device 118 following computing device 118 generating or receiving the first notification.

Clause 1. A method comprising a method comprising: receiving, by a computing device, an indication of a movement of the computing device detected by a motion sensor operatively coupled to the computing device; and responsive to a determination to output an indication of notification data, outputting, by the computing device and for presentation at an output component operatively coupled to the computing device, the indication of the notification data, wherein the determination to output the indication of the notification data is based on a degree of correspondence between the movement of the computing device and a predefined movement of the computing device, and is further based on one or more characteristics of the notification data.

Clause 2. The method of clause 1, wherein the one or more characteristics of the notification data include an elapsed time, the elapsed time being an amount of time that has elapsed from after the computing device receives the notification data to receiving the indication of the movement of the computing device.

Clause 3. The method of clause 2, wherein if the elapsed time exceeds a threshold amount of time, the determination to output the indication of the notification is based on a higher degree of correspondence between the indication of the movement of the computing device and the predefined movement of the computing device than if the elapsed time does not exceed the threshold amount of time.

Clause 4. The method of clause 1, wherein the one or more characteristics of the notification data include a priority level of the notification data.

Clause 5. The method of clause 4, wherein the priority level of the notification data is determined based on at least one of data regarding the computing device or data regarding a user of the computing device.

Clause 6. The method of clause 5, wherein the data regarding the computing device or the data regarding the user of the computing device comprises at least one of: a current or past location of the computing device; data indicative of a current or past activity of the user of the computing device; or calendar information for the user of the computing device.

Clause 7. The method of clause 1, wherein the computing device or another computing device determines whether to output the indication of the notification data.

Clause 8. The method of clause 1, wherein: the one or more characteristics of the notification data are a first set of one or more characteristics of the notification data, the output device is a display component, and outputting the indication of the notification data comprises: outputting, by the computing device and for display at the display component does not output the indication of the notification data, the indication of the notification data such that the display component displays the indication of the notification data with an amount of luminosity, and wherein the amount of luminosity is determined based on a second, different set of one or more characteristics of the notification data.

Clause 9. The method of clause 8, wherein the second set of one or more characteristics of the notification data include an elapsed time, the elapsed time being an amount of time that has elapsed from after the computing device receives the notification data to receiving the indication of the movement of the computing device.

Clause 10. The method of clause 9, wherein if the elapsed time exceeds a threshold amount of time, the amount of luminosity is lower than if the elapsed time does not exceed the threshold amount of time.

Clause 11. The method of clause 8, wherein the amount of luminosity is determined based at least in part on the degree of correspondence, and a gesture count, wherein the gesture count indicates a number of times the computing device has received indications of movements of the computing device detected after the computing device receives the notification data and preceding a current time.

Clause 12. The method of clause 8, wherein the second set of one or more characteristics of the notification data includes a priority level of the notification data.

Clause 13. The method of clause 12, wherein the priority level of the notification data is determined based on at least one of data regarding the computing device or data regarding a user of the computing device.

Clause 14. The method of clause 13, wherein the data regarding the computing device or the data regarding the user of the computing device comprises at least one of: a current or past location of the computing device; data indicative of a current or past activity of the user of the computing device; or calendar information for the user of the computing device.

Clause 15. The method of clause 12, wherein the priority level of the notification data is determined based on content of the notification data.

Clause 16. The method of clause 1, wherein: the output device is a display component, and outputting the indication of the notification data comprises: outputting, by the computing device and for display at the display component, the indication of the notification data such that the display component displays the indication of the notification data with an amount of luminosity, wherein the amount of luminosity is positively related to the degree of correspondence between the movement of the computing device and the predefined movement of the computing device.

Clause 17. A computing device comprising: an output component; a motion sensor; and one or more processors, coupled to the output component and the motion sensor, configured to: receive, from the motion sensor, an indication of a movement of the computing device; and responsive to a determination to output an indication of notification data, output, for presentation at the output component, the indication of the notification data, wherein: the determination to output the indication of the notification data is based on a degree of correspondence between the movement of the computing device and a predefined movement of the computing device and is also based on one or more characteristics of the notification data.

Clause 18. The computing device of clause 17, wherein the one or more characteristics of the notification data include an elapsed time, the elapsed time being an amount of time that has elapsed after the computing device receives the notification data.

Clause 19. The computing device of clause 17, wherein the one or more characteristics of the notification data include a priority level of the notification data, the priority level of the notification data being determined based on at least one of: data regarding a user of the computing device, or content of the notification data.

Clause 20. The computing device of clause 17, wherein: the output component is an electronic display, the one or more processors are configured to output, for display by the electronic display, the indication of the notification data such that the electronic display outputs the indication of the notification data with an amount of luminosity, the amount of luminosity is determined based at least in part on an elapsed time, an importance of the notification data, the degree of confidence, and a gesture count, the elapsed time is an amount of time that has elapsed following the computing device receiving or generating the notification data, and the gesture count indicates a number of times the computing device has received indications of movements of the computing device following the computing device receiving or generating the notification data and preceding a current time.

Clause 21. The computing device of clause 17, wherein: the output device is an electronic display, and the one or more processors are configured to output, for display at the electronic display, the indication of the notification data such that the electronic display displays the indication of the notification data with an amount of luminosity, wherein the amount of luminosity is positively related to the degree of correspondence between the movement of the computing device and the predefined movement of the computing device Clause 22. A non-transitory computer-readable storage medium having instructions stored thereon that, when executed, cause one or more processors of a computing device to: receive or generate notification data; receive, from a motion sensor operatively coupled to the computing device, an indication of a movement of the computing device; responsive to a determination to output an indication of the notification data, output, for display by a display component operatively coupled to the computing device, the indication of the notification data, wherein: the determination to output the indication of the notification data is based on a degree of correspondence between the movement of the computing device and a predefined movement of the computing device and is also based on an elapsed time, the predefined movement of the computing device is a movement that causes the computing device to display graphical screen content comprising the indication of the notification data, the elapsed time is an amount of time that has elapsed following the computing device receiving or generating the notification data, and an amount of luminosity with which the display component displays the indication of the notification data is determined based at least in part on the elapsed time and the degree of correspondence.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or may include communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:
1. A method comprising:
  receiving, by a computing device, an indication of a movement of the computing device detected by a motion sensor operatively coupled to the computing device;
  determining a degree of correspondence between the movement of the computing device and a predefined movement of the computing device;
  determining, based on both the degree of correspondence and one or more characteristics of notification data, whether to output an indication of the notification data; and
  responsive to determining to output the indication of the notification data, outputting, by the computing device and for presentation at a display component operatively coupled to the computing device, the indication of the notification data;

wherein:
the one or more characteristics of the notification data are a first set of one or more characteristics of the notification data, and
outputting the indication of the notification data comprises:
outputting, by the computing device and for display at the display component, the indication of the notification data such that the display component displays the indication of the notification data with an amount of luminosity, and wherein the amount of luminosity is determined based on a second, different set of one or more characteristics of the notification data;
wherein the second set of one or more characteristics of the notification data include an elapsed time, the elapsed time being an amount of time that has elapsed from after the computing device receives the notification data to receiving the indication of the movement of the computing device; and
wherein if the elapsed time exceeds a threshold amount of time, the amount of luminosity is lower than if the elapsed time does not exceed the threshold amount of time.

2. The method of claim 1, wherein the one or more characteristics of the notification data include an elapsed time, the elapsed time being an amount of time that has elapsed between when the computing device receives the notification data to when the computing device receives the indication of the movement of the computing device.

3. The method of claim 2, wherein if the elapsed time exceeds a threshold amount of time, determining whether to output the indication of the notification is further based on a higher degree of correspondence between the indication of the movement of the computing device and the predefined movement of the computing device than if the elapsed time does not exceed the threshold amount of time.

4. The method of claim 1, wherein the one or more characteristics of the notification data include a priority level of the notification data.

5. The method of claim 4, further comprising:
determining, based on at least one of data regarding the computing device or data regarding a user of the computing device, the priority level of the notification data, wherein the data regarding the computing device or the data regarding the user of the computing device comprises at least one of:
a current or past location of the computing device;
data indicative of a current or past activity of the user of the computing device; or
calendar information for the user of the computing device.

6. The method of claim 1, wherein the computing device comprises a wearable device that is wirelessly linked to another computing device, and wherein the other computing device determines whether to output the indication of the notification data.

7. The method of claim 1, wherein the amount of luminosity is determined based at least in part on the degree of correspondence and a gesture count, wherein the gesture count indicates a number of times the computing device has received indications of movements of the computing device detected after the computing device receives the notification data and preceding a current time.

8. The method of claim 1, wherein:
outputting the indication of the notification data comprises:
outputting, by the computing device and for display at the display component, the indication of the notification data such that the display component displays the indication of the notification data with an amount of luminosity,
wherein the amount of luminosity is positively related to the degree of correspondence between the movement of the computing device and the predefined movement of the computing device.

9. The method of claim 1, further comprising
responsive to determining not to output the indication of the notification data, outputting, by the computing device and for presentation at the display component, ambient screen content that is unrelated to the notification data.

10. The method of claim 9, wherein the display component consumes less power when displaying the ambient screen content than when outputting the indication of the notification data.

11. A non-transitory computer-readable storage medium having instructions stored thereon that, when executed, cause one or more processors of a computing device to:
receive or generate notification data;
receive, from a motion sensor operatively coupled to the computing device, an indication of a movement of the computing device;
determining a degree of correspondence between the movement of the computing device and a predefined movement of the computing device;
determine, based on both the degree of correspondence and one or more characteristics of the notification data, whether to output an indication of the notification data;
responsive to determining to output the indication of the notification data, output, for display by a display component operatively coupled to the computing device, the indication of the notification data, wherein:
the predefined movement of the computing device is a movement that causes the computing device to display graphical screen content comprising the indication of the notification data, and
an amount of luminosity with which the display component displays the indication of the notification data is determined based at least in part on the degree of correspondence and an amount of time that has elapsed since the computing device received or generated the notification data.

12. The non-transitory computer-readable storage medium of claim 11, wherein the one or more characteristics of the notification data comprise a priority level of the notification data, and further comprising instructions that cause the one or more processors to determine the amount of luminosity comprise instructions that cause the one or more processors to determine a score based on:
the degree of correspondence and amount of time that has elapsed since the computing device received or generated the notification data,
the priority level of the notification data,
the degree of correspondence, and
a gesture count, wherein the gesture count indicates a number of times the computing device has received indications of movements of the computing device detected after the computing device receives the notification data and preceding a current time.

13. The non-transitory computer-readable storage medium of claim 12, wherein the instructions that cause the one or more processors to determine whether to output an indication of the notification data comprise instructions that cause the one or more processors to:

output the indication of the notification data in response to determining that the score is greater than a threshold.

14. The non-transitory computer-readable storage medium of claim 13, wherein the instructions that cause the one or more processors to determine the amount of luminosity comprise instructions that cause the one or more processors to:

determine the amount of luminosity based on the score.

* * * * *